US012749097B2

(12) United States Patent
Pal et al.

(10) Patent No.: US 12,749,097 B2
(45) Date of Patent: Sep. 29, 2026

(54) SYSTEMS AND METHODS FOR REPLICATING MARKETING CAMPAIGNS IN A TIERED SOFTWARE FRAMEWORK

(71) Applicant: HighLevel Inc., Dallas, TX (US)

(72) Inventors: Nilasish Pal, Asansol (IN); Sayeed Mohammed, Ambur (IN); Ashutosh Anand, Bokaro (IN); Abhishek Maheshwari, Bathinda (IN); Shaun Clark, Eugene, OR (US); Robin Alex, Dallas, TX (US); Varun Vairavan, Doha (QA)

(73) Assignee: InsideRE, LLC, Murray, UT (US)

( * ) Notice: Subject to any disclaimer, the term of this patent is extended or adjusted under 35 U.S.C. 154(b) by 106 days.

(21) Appl. No.: 18/945,740

(22) Filed: Nov. 13, 2024

(65) Prior Publication Data

US 2026/0134454 A1 May 14, 2026

(51) Int. Cl.
*G06Q 30/0241* (2023.01)
*G06F 21/10* (2013.01)

(52) U.S. Cl.
CPC ..... *G06Q 30/0276* (2013.01); *G06F 21/1012* (2023.08); *G06Q 30/0277* (2013.01)

(58) Field of Classification Search
CPC ............ G06Q 30/0276; G06Q 30/0277; G06F 21/1012
See application file for complete search history.

(56) References Cited

U.S. PATENT DOCUMENTS 11,044,257 B1 6/2021 Heuts et al.
2002/0069116 A1 6/2002 Ohashi et al.
2007/0067297 A1* 3/2007 Kublickis .............. G06Q 30/02 707/999.009
2014/0249912 A1* 9/2014 Znerold ............ G06Q 30/0242 705/14.41
2015/0170189 A1* 6/2015 Santaella ........... G06Q 30/0229 705/14.3
2016/0012493 A1 1/2016 Tuatini et al.
2024/0185288 A1 6/2024 Liu et al.

OTHER PUBLICATIONS

Middleware-based Database Replication: The Gaps Between Theory and Practice Emmanuel Cecchet, George Candea, Anastasia Ailamaki Appears in Proceedings of the ACM SIGMOD Conference, Vancouver, Canada (Jun. 2008) (Year: 2008).*

* cited by examiner

*Primary Examiner* — Alexandru Cirnu
(74) *Attorney, Agent, or Firm* — Aambell PC

(57) ABSTRACT

An application for replicating marketing campaigns using snapshots in a tiered software framework is disclosed. A snapshot of the marketing campaign may be generated at a first account in a tiered software framework. An asset in the snapshot may be stored at a location identified by a signed uniform resource locator (URL). The signed URL may be associated with an asset identifier, and the location may refer to a folder in a bucket of a content delivery network. The asset may be replaced with the asset identifier in the snapshot. The snapshot may be encoded as a link and shared with a second account. The tiered software framework may comprise a plurality of tiers separated by data access policies, and the snapshot may be generated at the second tier for a marketing campaign to be executed at the first tier.

20 Claims, 14 Drawing Sheets

SYSTEMS AND METHODS FOR REPLICATING MARKETING CAMPAIGNS IN A TIERED SOFTWARE FRAMEWORK

TECHNICAL FIELD

The present disclosure relates to systems, techniques, and methods directed to systems and methods for replicating marketing campaigns in a tiered software framework.

BACKGROUND

Various types of marketing software help businesses plan, execute, manage, and analyze their marketing campaigns. Some features of such tools typically include the following: scheduling and organizing various marketing activities across channels (email, social media, etc.); automating repetitive tasks such as email sending, social media posting, and lead nurturing; providing data-driven insights into campaign performance through metrics such as engagement rates, conversion rates, and return on investment; segmenting audiences for tailored messaging based on demographics, behavior, and preferences; and enabling shared access to resources, timelines, and communications.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings.

DETAILED DESCRIPTION

Overview

Figure 1A:
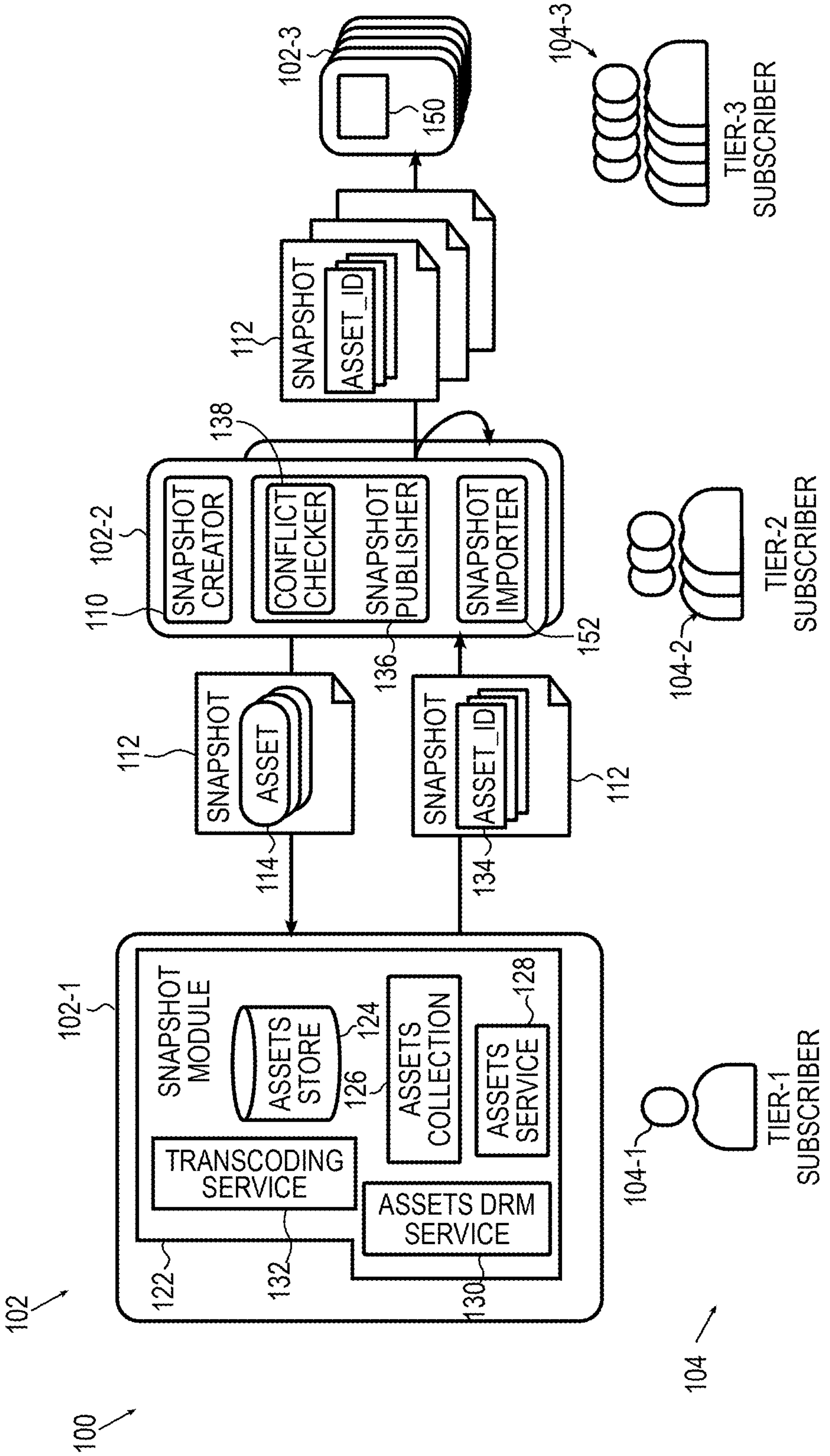
FIGS. 1A-1D are simplified block diagrams illustrating an example system for replicating a marketing campaign in a tiered software framework.
Figure 1B:
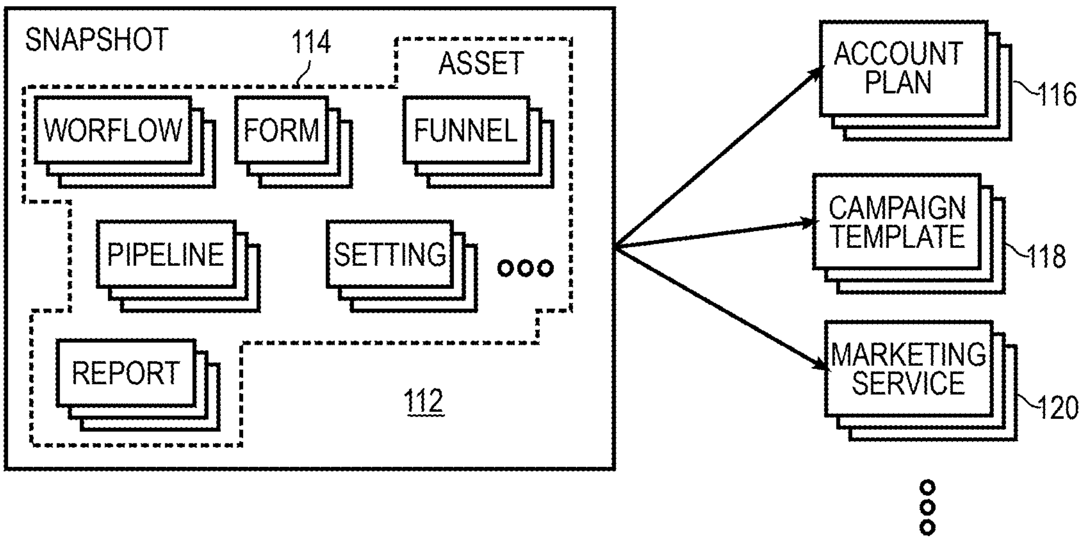

For purposes of illustrating the embodiments described herein, it is important to understand certain terminology and operations of technology networks. The following foundational information may be viewed as a basis from which the present disclosure may be properly explained. Such information is offered for purposes of explanation only and, accordingly, should not be construed in any way to limit the broad scope of the present disclosure and its potential applications.

A marketing campaign is a coordinated series of activities designed to achieve specific business goals, such as increasing brand awareness, generating leads, or driving sales. A typical marketing campaign includes the following elements: campaign objectives (e.g., clearly defined goals, such as launching a new product, entering a new market, or boosting customer engagement); a target audience (e.g., specific demographics and psychographics of an audience that the marketing campaign aims to reach); a campaign strategy (e.g., a plan outlining an approach to achieve the objectives, including messaging, positioning, and channels to be used (e.g., social media, email, etc.); marketing tactics (e.g., specific actions taken to implement the marketing strategy, such as creating content, running promotions, and hosting events); campaign timeline (e.g., a schedule that outlines when each part of the campaign will be executed); and measurement criteria for assessing the marketing campaign's performance, using metrics such as engagement rates, conversion rates, and ROI.

Software tools are increasingly used in developing and running effective marketing campaigns. Examples of such tools include project management tools to plan timelines, assign tasks, and track progress; marketing automation tools that enable scheduling and execution of repetitive tasks such as sending out emails, posting social media content, etc.; designing engaging creative content; managing customer data and personalized messages through customer relationship management (CRM) techniques; analytics tools for providing insights into the campaign performance; testing tools to test effectiveness of different campaign elements; tools to manage social media content; etc. Some tools provide more than one such functionality for a particular type of market (e.g., real estate, automotive, legal, etc.), whereas others specialize in one specific functionality (e.g., project management, data analysis, etc.) across many different markets. Various flavors and types of such marketing tools find use and effectiveness in specific niches.

Many businesses use marketing agencies to develop and run their marketing campaigns. Some marketing agencies are generalists across multiple markets, whereas others are specialists in a specific one or a few markets. In general, they are used for their expertise, access to resources, time savings, and network, to name a few advantages. Typically, from the viewpoint of a marketing agency, a live client account at any given time comprises a specific marketing campaign populated with the client's data. Some client accounts may have overlaps in target audience, market, platforms, or other such attributes. In such a scenario, the marketing agency may desire to replicate and use campaigns for one client that were created for another client.

Using snapshots is a convenient way of performing such replication. Snapshots allow users to capture the entire structure and design of a funnel at a particular point in time, ensuring that all settings and customizations are stored. Successful funnels can be duplicated for different products or campaigns without having to recreate each component from scratch. Snapshots can be shared with team members or clients, enabling collaboration and streamlining the workflow for campaign development. Snapshots serve as a backup of funnel configurations, allowing users to restore previous versions if needed. Currently, replicating or sharing snapshots requires manual copying from one account to another. The individual assets in the snapshots may be copied using the actual digital file or through a link where the file is saved in the cloud and appropriate permissions to access the link are provided. In marketing campaigns that use many different complex workflows, pipelines, etc., manual copying of the snapshot is a tedious task, prone to human error. Replicating digital assets may use up costly memory space; providing links is fraught with the risk of inaccurate data access permissions each time the link is sent. Further, there are risks of impermissible copyright infringement; data piracy; and other such cybersecurity threats when manual means are employed, particularly where the snapshots are sold to downstream purchasers, who then resell the snapshot without authorization of the copyright holder.

Accordingly, in some aspects, the techniques described herein relate to a method for replicating marketing campaigns in a tiered software framework, the method including: generating, at a first account, a snapshot of a marketing campaign in the tiered software framework that includes a plurality of tiers separated by data access policies such that data at a first tier is accessible at a second tier and data at the second tier is not accessible at the first tier. The snapshot is generated at the second tier for a marketing campaign to be executed at the first tier. The method further includes storing an asset in the snapshot at a location identified by a signed uniform resource locator (URL), which is associated with an asset identifier, and the signed URL points to a location in a content delivery network (CDN); replacing the asset with the asset identifier in the snapshot; encoding the snapshot as a link; and sharing the link with a second account.

In the following detailed description, various aspects of the illustrative implementations may be described using terms commonly employed by those skilled in the art to convey the substance of their work to others skilled in the art.

The term "snapshot" refers to a saved version of a specific setup of a marketing campaign (which may also be simply called a "campaign"). The marketing campaign is a coordinated series of promotional activities tailored to achieve specific business goals, such as increasing brand awareness, generating leads, or driving sales, targeting a predefined audience over a predetermined period. The snapshot includes configurations for workflows (e.g., sequence of tasks and processes that outline how various marketing activities are organized and executed), funnels (e.g., websites tailored to guide visitors through a structured process, referred to as a sales funnel, aimed at converting them into leads or customers), forms (e.g., tools used to collect information from potential customers or leads), pipelines (e.g., systematic processes of tracking and managing potential customers as they progress through the stages of engagement, from initial awareness to conversion), channels (e.g., platforms, social media, etc.), settings of various campaign element attributes (e.g., target geographic areas, target audience, number of emails per day, etc.), and such other inter-linked elements of a marketing campaign. In some embodiments, the snapshot may include assets relevant to a particular business; in other embodiments, the snapshot may include assets relevant to several businesses that share some common attribute (e.g., target audience, market, campaign goal, campaign strategy, etc.). From the viewpoint of a marketing agency, the snapshot represents a client account at any given time that is running (or has run or will run) a particular marketing campaign. On the other hand, from the viewpoint of a business, the snapshot represents a particular marketing campaign that the business is running (or has run or will run).

The term "asset" in reference to snapshots refers to any digital data used to support and execute the marketing campaign represented by the snapshot. Assets can take various forms, including the following: creative content, such as images, videos, graphics, and animations designed to engage a target audience of the marketing campaign; copy (e.g., textual content), such as blog posts, social media posts, email newsletters, and website content that communicates a message of the marketing campaign; landing pages of dedicated web pages tailored to capture leads or drive conversions related to the marketing campaign; advertisements, such as banners, used in digital marketing across various marketing platforms (e.g., Google Ads™, social media, display networks); dashboards and reports for tracking and analyzing performance of the marketing campaign; and brand guidelines, including templates, for documenting proper use of logos, colors, and fonts to maintain brand consistency throughout the marketing campaign.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The term "computing device" means a server, a desktop computer, a laptop computer, a smartphone, or any device with a microprocessor, such as a central processing unit (CPU), general processing unit (GPU), or other such electronic component capable of executing processes of a software algorithm (such as a software program, code, application, macro, etc.).

The term "cloud network" or simply "cloud" means a network of computing devices coupled together in a public, private, or hybrid communications network. Communication in the cloud network may use one or more wired, wireless, broadband, radio, and other kinds of communicative means. The Internet is an example of a cloud network.

The term "application" can be inclusive of an executable file comprising instructions that can be understood and processed on a computing device such as a computer, and may further include library modules loaded during execution, object files, system files, hardware logic, software logic, or any other executable modules. Applications are generally configured to perform particular tasks, or functions according to the type of application.

The description uses the phrases "in an embodiment" or "in embodiments," which may each refer to one or more of the same or different embodiments.

Although certain elements may be referred to in the singular herein, such elements may include multiple sub-elements. For example, "a computing device" may include one or more computing devices.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale. In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respectively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as routers, switches, antennas, communication devices, etc. in the networks disclosed that are not shown in the figures to prevent cluttering. Systems and networks described herein may include, in addition to the elements described, other components and services, including network management and access software, connectivity services, routing services, firewall services, load balancing services, content delivery networks, virtual private networks, etc. Further, the figures are intended to show relative arrangements of the components within their systems, and, in general, such systems may include other components that are not illustrated (e.g., various electronic components related to communications functionality, electrical connectivity, etc.).

In the drawings, a particular number and arrangement of structures and components are presented for illustrative purposes and any desired number or arrangement of such structures and components may be present in various embodiments. Further, unless otherwise specified, the structures shown in the figures may take any suitable form or shape according to various design considerations, manufacturing processes, and other criteria beyond the scope of the present disclosure.

Figure 10:
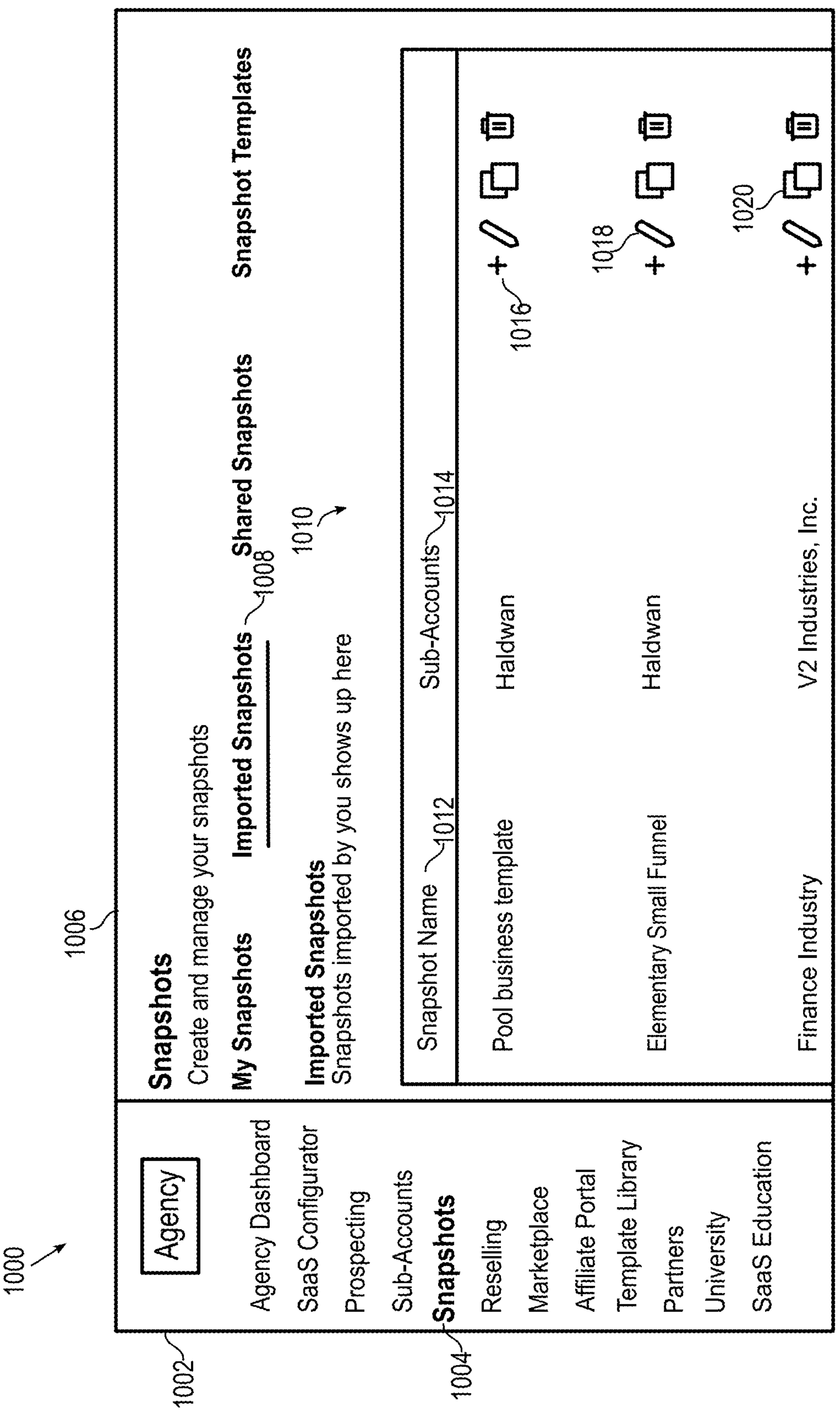
FIG. 10 a simplified diagram illustrating another example user interface associated with a system for replicating a marketing campaign in a tiered software framework.

For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 106*a*, 106*b*), such a collection may be referred to herein without the letters (e.g., as "106") and individual ones in the collection may be referred to herein with the letters. Further, labels in upper case in the figures (e.g., 106A) may be written using lower case in the description herein (e.g., 106*a*) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Example Embodiments

FIGS. 1A-1D are simplified block diagrams illustrating various details of an example snapshot application 100 according to embodiments of the present disclosure. Snapshot application 100 may comprise various tiers 102. In the example shown, three tiers are shows, namely 102-1, 102-2 and 102-3. Note that the labeling convention followed herein uses the hyphen followed by a number to denote a separate tier corresponding to the number (e.g., "-1" denotes tier-1, "-2" denotes tier-2, and "-3" denotes tier-3). Tiers 102 may be accessed by subscribers 104 according to access credentials based on their respective tiers 102. For example, subscribers 104-1 may have access to tiers 102-1, 102-2, and 102-3; subscribers 104-2 may have access to tiers 102-2 and 102-3; and subscribers 104-3 may have access only to tier 102-3.

Tiers 102 may be organized according to a hierarchy of management (i.e., to oversee, to control, to maintain), with upstream tiers managing downstream ones. Thus, tier 102-1 comprises operations that may manage tiers 102-2 and 102-3, whereas tier 102-2 comprises operations that may manage tier 102-3 but not tier 102-1. For purposes of terminology, tier 102-1 is "upstream" relative to tiers 102-2 and 102-3; tier 102-3 is "downstream" relative to tiers 102-2 and 102-1; tier 102-2 is downstream relative to tier 102-1 and upstream relative to tier 102-3. In some embodiments, each tier 102 may interact with the tier immediately adjacent thereto (e.g., downstream or upstream) but not with non-adjacent tiers. In some other embodiments, any tier 102 may interact with any other tier. In an example embodiment, tier 102-3 comprises marketing activities by businesses such as a dentist's office, a plumber's business, etc.; tier 102-2 comprises software operations by one or marketing agencies whose customers are the businesses at tier 102-3; and tier 102-1 comprises software operations by subscriber 104-1 whose customers are the marketing agencies at tier 102-2.

Snapshot application 100 may be managed by subscriber 104-1 providing one or more downstream subscribers 104-2 at tier 102-2 with access to certain functionalities of snapshot application 100. In turn, subscriber 104-2 may provide one or more downstream subscriber 104-3 at tier 102-3 with access to certain other functionalities of snapshot application 100. In various examples, the functionalities available to subscribers 104-1 may not be the same as those available to subscribers 104-2, which may be different from those available to subscribers 104-3. In one example, functionalities available to subscribers 104-3 may be a subset of functionalities available to subscribers 104-2. Subscribers 104 (e.g., 104-1, 104-2 and 104-2) may include an entity (i.e., a company, an organization, etc.) in various embodiments. In an example embodiment, subscribers 104-1 may be software-as-a-service (SaaS) providers, subscribers 104-2 may comprise marketing agencies, and subscribers 104-3 may comprise individual businesses, such as plumbers, dentists, pet stores, etc.

Human users at subscribers 104 may operate or otherwise use snapshot application 100 through one or more devices such as computers, laptops, smartphones, mobile computing devices, mobile phones, iPads™, Google Droids™, Microsoft® Surface™, etc. In various embodiments, a single subscriber 104-1 may have multiple subscribers 104-2 at tier 102-2; a single subscriber 104-2 at tier 102-2 may have multiple subscribers 104-3 at tier 102-3. Each subscriber 104-2 may have an account with one subscriber 104-1 at tier 102-1; each subscriber 104-3 may have an account with one subscriber 104-2 at tier 102-2. In other words, there may be a one-to-many relationship downstream (e.g., from tier-1 to tier-2 to tier-3), and a one-to-one relationship upstream (e.g., from tier-3 to tier-2 to tier-1).

In various embodiments, snapshot application 100 may include a snapshot creator 110 executing at tier 102-2. Snapshot creator 110 may generate a snapshot 112 comprising one or more asset 114. Snapshot 112 is described in more detail in FIG. 1B. Asset 114 may include, by way of examples and not as limitations, configurations for one or more of workflow, form, funnel, pipeline, attribute setting, report and any other resource of material that may be relevant or is associated with a marketing campaign. In some embodiments, one each of such materials listed may be provided; in some other embodiments, some of the materials listed may be provided and others may not be provided; in yet other embodiments, one of some materials and a plurality of other materials may be provided. Various such combinations are included within the broad scope of the embodiments.

In various embodiments, snapshot 112 may be used to create marketing campaigns for accounts at tier 102-3, either for subscribers 104-3 to the tier-2 account that generates snapshot 112 or for other (competing) subscribers 104-2 at tier 102-2. In some embodiments, snapshot 112 may be linked to account plan 116, for example, such that snapshot 112 may be automatically applied when a customer purchases a subscription at tier 102-3. In another example, different account plans 116 may have correspondingly different snapshot 112 with pricier account plans 116 eligible for more features in snapshot 112. In some embodiments, snapshot 112 may be used to create campaign template 118, for example, a low cost "standard" template and a pricier "deluxe" template. In some such embodiments, snapshot 112 may be replicated across any account at tier 102-3 according to the particular template 118 that has been purchased. In yet other embodiments, snapshot 112 may be used to create marketing services 120, for example, a low cost "email" service that offers 500 marketing emails and a pricier "full-service" offering that provides funnel websites, social media posts, etc. In some such embodiments, snapshot 112 may be replicated across any account at tier 102-3 according to the particular marketing service 120 that has been purchased.

Turning back to FIG. 1A, snapshot creator 110 may send snapshot 112 to a snapshot module 122. In some embodiments, snapshot module 122 may execute at tier 102-1. In some other embodiments, snapshot module 122 may execute in tier 102-2. In yet other embodiments, portions of snapshot module 122 may execute at tier 102-1 and other portions may execute at tier 102-2. Snapshot module 122 may store one or more asset 114 in an asset store 124. Asset store 124 may be comprised in one or more cloud server that is part of a content delivery network (CDN) distributed across multiple cloud servers. Google Cloud Service™ (GCS) is an example of such a CDN. In other embodiments, asset store 124 may comprise a suitable storage device in one location. Encoded forms of one or more asset 114 may be included in an asset collection 126. An assets service 128 in snapshot module 122 may coordinate with an assets digital rights management (DRM) service 130 and a transcoding service 132 to generate an asset identifier 134 (asset_id) of respective asset 114. In various embodiments, asset identifier 134 may comprise a hexadecimal or alphanumeric text string identifying asset 114. In some other embodiments, asset identifier 134 may additionally comprise information on playback restrictions and access controls. Asset identifier 134 may be decipherable only by assets DRM service 130. For example, asset identifier 134 may be a key to accessing asset 114 through assets DRM service 130.

In various embodiments, assets service 128 may perform various functions such as sending suitable requests to assets DRM service 130 for encoding one or more asset 114; encrypting one or more asset 114, uploading one or more asset 114 to asset store 124; and so on. Assets DRM service 130 may enable protecting snapshot 112 from unauthorized access, copying, and distribution. Assets DRM service 130 may ensure that only authorized users can access specific assets 114. In various embodiments, assets DRM service 130 may be provisioned entirely within snapshot module 122 as shown in the figure. In some embodiments, at least some functionalities of assets DRM service 130 may be provisioned outside snapshot module 122 within the software framework. In yet other embodiments, assets DRM service 130 may be provisioned with a third-party provider, and such external functionalities may be accessed by snapshot module 122 suitably, for example, using an appropriate application programming interface (API). In various embodiments, assets DRM service 130 may facilitate encoding one or more asset 114 into a smaller sized text string, for example, to preserve storage space. In some embodiments, the encoding may also prevent unauthorized copying or sharing, ensuring that only those who have purchased or licensed the content can access it. In some embodiments, assets DRM service 130 may allow access restrictions to be placed on appropriate content, such as limiting the number of shares or devices.

In various embodiments, transcoding service 132 may work in conjunction with assets DRM service 130 to ensure that asset 114 is properly formatted for playback across various devices. In some embodiments, transcoding service 132 may convert one or more asset 114 from an original format to multiple formats and resolutions to accommodate different devices and streaming conditions. Assets service 128 may be configured to support DRM protected content, ensuring that only authorized users with the correct asset identifier 134 can access corresponding asset 114. In various embodiments, asset store 124 may implement encryption and other such cybersecurity measures to ensure that one or more asset 114 is accessed only with permission.

Snapshot 112 may be repopulated with one or more asset identifier 134 corresponding to one or more asset 114 and returned to a snapshot publisher 136 executing at tier 102-2. Snapshot publisher 136 may publish (e.g., duplicate, clone, share, copy, etc.) one or more copies of snapshot 112 to subscribers 104-3 at tier 102-3, or to other tier-2 subscribers 104-2 at tier 102-2. In various embodiments, snapshots 112 are eventually stored at (or pushed to) appropriate accounts (e.g., associated with separate subscribers 104) in tiers 102-2 and 102-3. In some embodiments, each instance of snapshot 112 may be stored as a shareable clone in the appropriate accounts at tier 102-3 that subscribes to subscriber 104-2 at tier 102-2. Each instance of snapshot 112 may comprise a replication of information about assets 114 including configurations, and interconnected processes of the relevant marketing campaign for the accounts at tier 102-3. During publishing, a conflict checker 138 in snapshot publisher 136 may determine whether assets 114 are being duplicated in the destination accounts of subscribers 104-3.

Figure 1C:
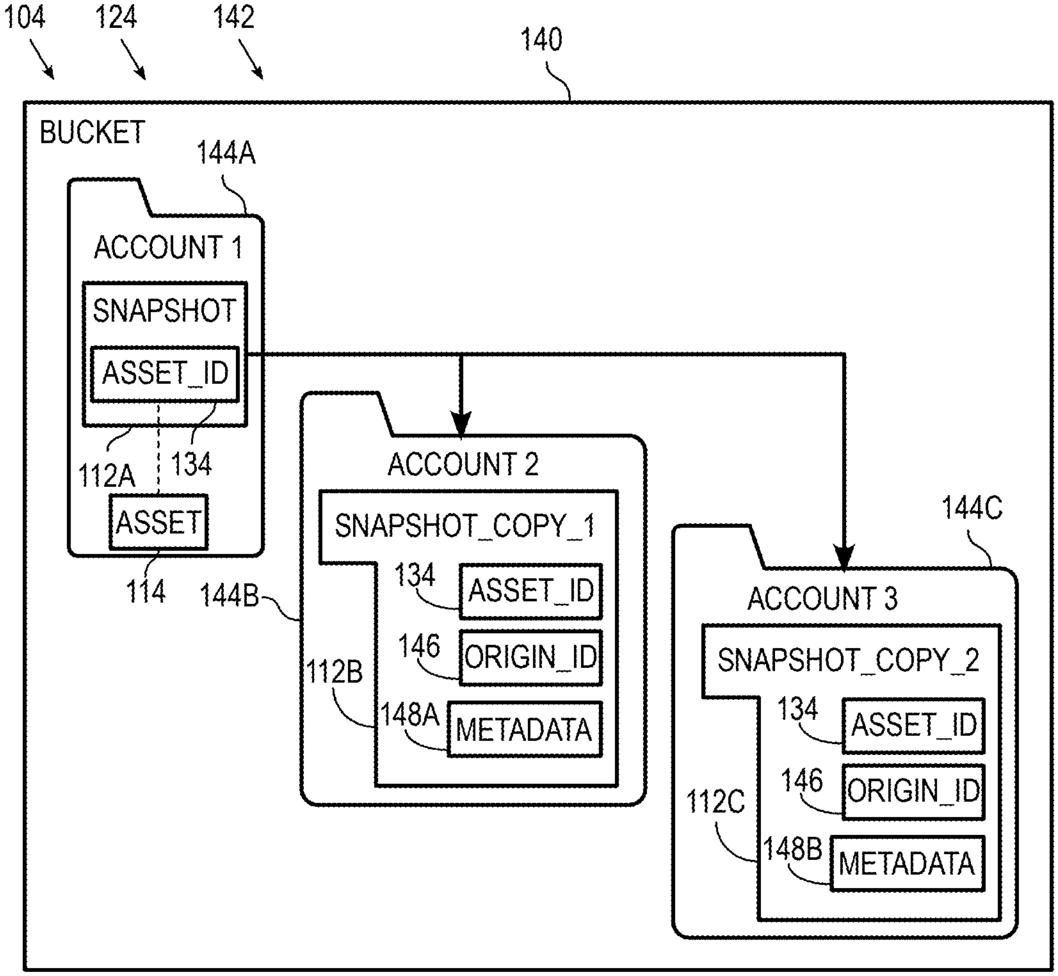

As explained in further detail in FIG. 1C, snapshot 112 may be stored in a bucket 140 in a CDN 142 in some embodiments. Bucket 140 may comprise a storage container in CDN 140 to store and serve content to users. Bucket 140 may be implemented across multiple memory storage devices across multiple servers in some embodiments, according to the configuration of CDN 140. In some other embodiments, bucket 140 may be implemented across multiple memory storage devices in the same server; in yet other embodiments, bucket 140 may be implemented in a single memory storage device in a server. Various other such configurations may be used without departing from the scope of the embodiments herein.

Each one of subscribers 104 may be associated with a separate folder 144 in bucket 140. In the example shown in FIG. 1C, folder 144a labeled "account 1" may be associated with subscriber 104-2a (not indicated to prevent clutter); folder 144b labeled "account 2" may be associated with subscriber 104-2b (not indicated to prevent clutter); folder 144c labeled "account 3" may be associated with subscriber 104-3a (not indicated to prevent clutter). Note that any number of folders 144 may be provisioned in bucket 140 within the scope of the embodiments herein. Assume, merely for example purposes that subscriber 104-2a has created snapshot 112a at tier 102-2. Snapshot 112a may include asset 114, which is referenced by asset identifier 134 in snapshot 112a. Assume, merely for example purposes, that asset 114 may have a filename ASSET_NAME.

In some embodiments, snapshot publisher 136 may implement a "Pushed to Linked Location" functionality that enables deployment of a current version of snapshot 112a to all linked locations. The linked locations are the accounts to which snapshot 112a is published. In the example shown, snapshot publisher 136 may publish snapshot 112a to folders 144b and 144c as snapshot 112b, labeled "snapshot_copy_1", and snapshot 112c, labeled "snapshot_copy_2", respectively. The respective URLs of folders 144b and 144c may be linked locations in this example. Snapshots 112b and 112c that are clones (as opposed to originals) may comprise, in addition to asset identifier 134, an origin identifier 146 (origin_id) and additional metadata 148a and 148b, respectively. Origin identifier 146 may identify the originating source of asset 114 (e.g., originating source//ACCOUNT 1/ASSET_NAME, saved at time 5:06 PM on Dec. 31, 2023) in a suitable alphanumeric string (e.g., //account_1/asset_name/12312023_0506). Metadata 148a and 148b may include various other information relevant to account 2 and account 3, respectively, for example, respective times of receiving snapshot 112b and 112c; respective local names of snapshot 112b and 112c; respective access terms of snapshot 112b and 112c; and other such information.

When pushing updates to such linked locations, conflicts may arise if asset 114 is already referenced in the account, either in a previous version of snapshot 112a or in an instance of another snapshot that was previously published to the account. Snapshot publisher 136 may address such conflicts with a "Check for Conflicts" feature, allowing human users to either skip the conflicting asset or override it with the updated version, ensuring smooth and controlled updates across multiple accounts. Conflict checker 138 may parse the contents of the receiving folders 144 for any alphanumeric string that matches origin identifier 146. If any such string is found, conflict checker 138 may provide an option to replace or retain the original asset. For example, a conflict may exist if snapshot 112b has been previously copied and is being pushed to folder 144b again. Such may be the case where snapshot 112a has been updated. The choice to retain or replace is presented to the user of subscriber 104-2a associated with the originating folder 144a. Tier 102 of the receiving folder 144 may be immaterial in the conflicts check; for example, conflicts checker 138 may execute substantially identically for folder 144b associated with subscriber 104-2b at tier 102-2, and folder 144c associated with subscriber 104-3a at tier 102-3.

In some embodiments, snapshot publisher 136 may enable a "share" functionality, which allows subscriber 104-2a, that has created snapshot 112a to share it with subscribers 104-2 at the same tier 102-2 via shareable links. These links enable easy import of snapshot 112 into their systems, which can then be cloned as needed to other subscribers 104-3 of the recipient, streamlining the replication and deployment process across different organizations. In such a mechanism, the actual assets 114 are not copied each time, and only their respective asset identifier 134 are copied in each instance of snapshot 112, saving storage space and increasing communication speed. In various embodiments, only one file of asset 114 may be stored in bucket 140; any other references to asset 114 may be by asset identifier 134.

Embodiments of the systems disclosed herein may facilitate quick replication of snapshot 112a to various accounts at tier 102-3 or 102-2, enabling the creation of multiple identical clones of snapshot 112a with consistent assets 114 across all of the linked accounts. In some embodiments, changes to snapshot 112a may be made by snapshot creator 110 at tier 102-2; the changes may be propagated to all instances of snapshot 112a at the various accounts to which it has been published. In some embodiments, the changes may be propagated in real time; in other embodiments, the changes may be propagated according to preconfigured settings at snapshot creator 110. In yet other embodiments, the changes may be propagated when a user at the relevant account refreshes the corresponding instance of snapshot 112a.

Turning back to FIG. 1A, snapshot 112 may be executed by a snapshot executor 150 executing in the appropriate account at tier 102-3. Snapshot executor 150 may implement snapshot 112 suitably. Merely as an example, assume that asset 114 is an image, and snapshot 112 represents the configuration for running an email marketing campaign, the emails being formatted as hypertext markup language (HTML). During execution, snapshot executor 150 may generate the HTML email with asset 114 referenced as an <img> tag having a <src> attribute that specifies the URL of assets DRM service 130 along with asset identifier 134. When the recipient's email client processes the HTML content, it recognizes the <img> tag and attempts to fetch the image from the provided URL. In various embodiments, assets DRM service 130 may read asset identifier 134, decipher the access and playback restrictions, and if permissions are found, return the actual signed URL of the image. Thereupon, the email client may fetch the image data from asset store 124 accordingly. In some embodiments, assets DRM service 130 may fetch the image data from asset store 124 and return it to the email client directly. The email client may display the fetched image in the email body, allowing the recipient to view it directly within the email in real time. Some email clients may automatically download the image, while others may require the recipient to allow images to be displayed to protect against privacy and security risks (e.g., tracking pixels). Note that during the operation, from publishing to execution of snapshot 112, asset 114 is not removed, or copied, or otherwise duplicated from asset store 124 before the recipient's email client downloads a copy of it, enabling storage efficiency and faster performance over communication networks.

In various embodiments, a snapshot importer 152 executing at tier 102-2 may enable importing (e.g., receiving, sharing, etc.) snapshot 112 from other accounts. Imported snapshots may be received using share links provided by another snapshot publisher 136 (e.g., from another account at tier 102-2). Once imported, the snapshots can be utilized to create new marketing campaigns within the receiver and for subscribers 104-3 thereof, allowing seamless integration of pre-built assets and configurations. In some embodiments, imported snapshots may not be shared further, for example, they may be restricted to use within the receiving account at tier 102-2 and to subscribers 104-3 thereof, and may not be distributed to other accounts at tier 102-2 or other subscribers 104-3.

Figure 1D:
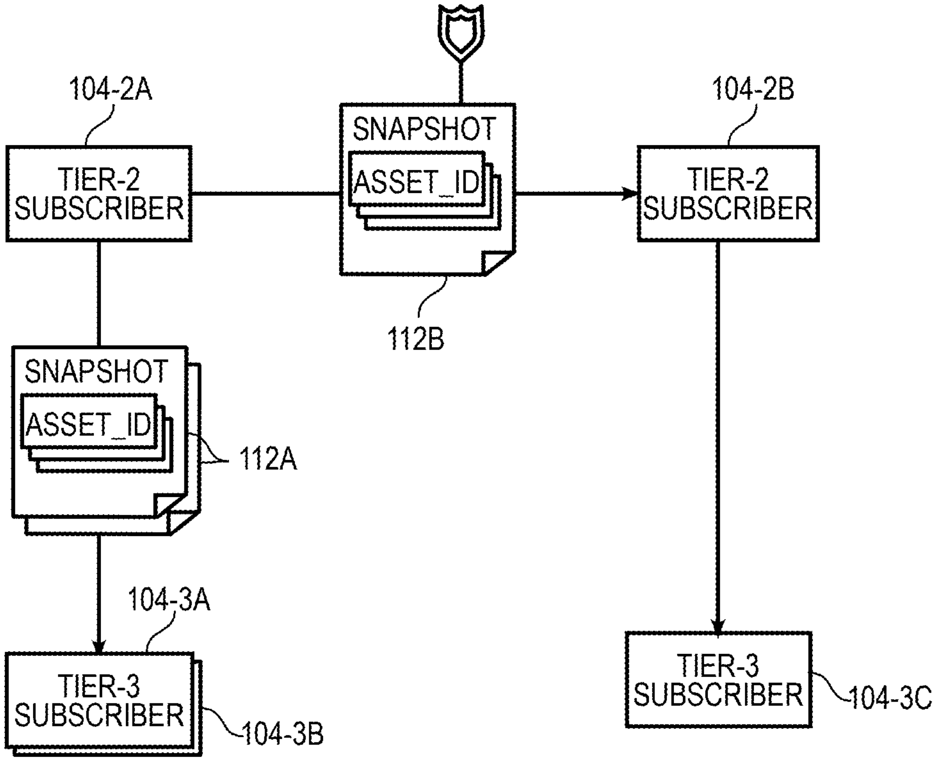

FIG. 1D provides further details of snapshot application 100. Assume, merely for example purposes, that tier-2 subscriber 104-2*a*, which is marketing agency Alpha, has generated snapshot 112, representing marketing campaigns tailored for the dentistry business. Snapshot 112 may be generated with multiple instances, namely various duplicate snapshots 112*a* and 112*b*. The only difference between snapshot 112*a* and snapshot 112*b* is that snapshot 112*b* has restricted sharing as represented by a shield icon for illustrative purposes, whereas snapshot 112*a* has unrestricted sharing. Subscriber 104-2*a* may publish (e.g., push, share, distribute, etc.) snapshot 112*a* with one or more tier-3 subscribers thereof, for example, subscribers 104-3*a* and 104-3*b*, which may be dentistry businesses that have signed on with marketing agency Alpha for their marketing campaigns. Note that two subscribers are described merely for illustrative purposes and not as limitations. Snapshot 112*a* may be pushed to any number of subscribers 104-3 within the broad scope of the embodiments. Snapshot 112*a* may be published to subscribers 104-3*a* and 104-3*b* without any restrictions as to their subsequent use or sharing. For example, marketing agency Alpha may be in control of all aspects of the marketing operations of these dentistry businesses and therefore, there may not be any risk in unrestrictedly sharing snapshot 112*a*. Various other reasons for not restricting sharing may be applicable beyond the scope of the disclosure herein.

Subscriber 104-2*b* may be another marketing agency, Beta, operating an account at tier 102-2. Subscriber 104-3*c* may be yet another dentistry business that has signed on with marketing agency Beta. For various reasons, marketing agency Beta may desire to purchase snapshot 112 from marketing agency Alpha. For example, Beta may not have too many dentistry businesses as clients, and therefore, it may not be cost effective for Beta to create a snapshot just for one dentistry business. As another rationale, Alpha may be famous for its success at running marketing campaigns for dentistry businesses and Beta may desire to provide its client with a winning marketing campaign. Various other reasons may be applicable beyond the scope of the disclosure herein. Sharing snapshot 112 with Beta may not be without risks for Alpha considering their mutually competitive status. Thus, Alpha may restrict further sharing of snapshot 112*b* using appropriate DRM mechanisms. Beta may push snapshot 112*b* to subscriber 104-3*c* once, but any subsequent reuse may be prohibited according to the restrictions placed digitally on snapshot 112*b*. Any additional copies (e.g., instances) of snapshot 112 may have to be purchased anew from Alpha individually.

Figure 2:
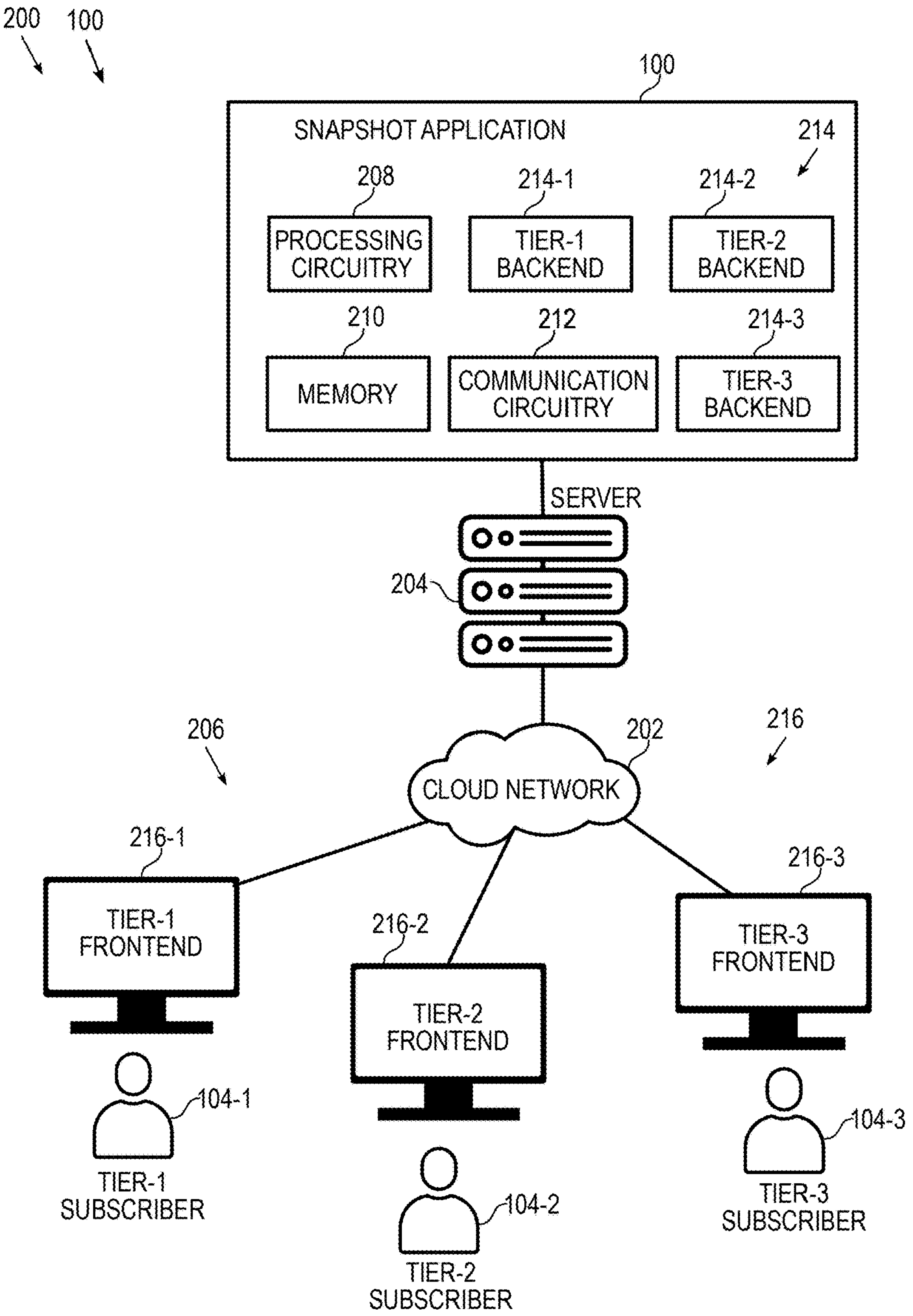
FIG. 2 is a simplified block diagram illustrating an example tiered software framework in an example system for optimizing advertisements.

FIG. 2 is a simplified block diagram illustrating a tiered software framework 200 according to various embodiments. In example implementations, at least some portions of the activities outlined herein may be hosted on a cloud network 202 in one or more servers 204. At least some other portions of the activities outlined herein may be implemented in one or more computing devices 206 connected over one or more communication networks with cloud network 202. In particular embodiments, cloud network 202 is a collection of hardware devices and executable software forming a shared pool of configurable computing resources (e.g., networks, servers, storage, applications, services, etc.) that may be suitably provisioned to provide on-demand self-service, network access, resource pooling, elasticity and measured service, among other features. Computing device 206 may have any desired form factor, such as a handheld or mobile computing device (e.g., a cell phone, a smart phone, a mobile Internet device, a tablet computer, a laptop computer, a netbook computer, an ultra-book computer, a Personal Digital Assistant (PDA), an ultramobile personal computer, etc.), a desktop computing device, a server or other networked computing component, a set-top box, an entertainment control unit, or a wearable computing device.

Certain portions of tiered software framework 200 (e.g., snapshot application 100) may execute using a processing circuitry 208, a memory 210 and communication circuitry 212 (among other components) in one or more servers 204. Certain other portions of tiered software framework 200 may execute in one or more computing devices 206 using respective processing circuitry, memory, and communication circuitry (not shown with particularity so as not to clutter the drawing) substantially similar in functionalities to processing circuitry 208, memory 210 and communication circuitry 212. In some embodiments, one or more of these features may be implemented in hardware, provided external to these elements, or consolidated in any appropriate manner to achieve the intended functionality. The various network elements in tiered software framework 200 may include communication software that can coordinate to achieve the operations as outlined herein. In still other embodiments, these elements may include any suitable algorithms, hardware, software, components, modules, interfaces, or objects that facilitate the operations thereof.

Processing circuitry 208 may execute any type of instructions associated with data stored in memory 210 to achieve the operations detailed herein. In one example, processing circuitry 208 may transform data from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., field programmable gate array (FPGA), an erasable programmable read only memory (EPROM), an application specific integrated circuit (ASIC)) that includes digital logic, software, code, electronic instructions, flash memory, optical disks, magnetic or optical cards, other types of machine-readable mediums suitable for storing electronic instructions, or any suitable combination thereof.

In some of example embodiments, one or more memory 210 may store data used for the operations described herein. This includes memory 210 storing instructions (e.g., software, logic, code, etc.) in non-transitory media (e.g., random access memory (RAM), read only memory (ROM), FPGA, EPROM, etc.) such that the instructions are executed to carry out the activities described in this disclosure based on particular needs. In some embodiments, memory 210 may comprise non-transitory computer-readable media, including one or more memory devices such as volatile memory such as dynamic RAM (DRAM), nonvolatile memory (e.g., ROM), flash memory, solid-state memory, and/or a hard drive. In some embodiments, memory 210 may share a die with processing circuitry 208. Memory 210 may include algorithms, code, software modules, and applications, which may be executed by processing circuitry 208. The data being tracked, sent, received, or stored in tiered software framework 200 may be provided in any database, register, table, cache, queue, control list, or storage structure, based on particular needs and implementations, all of which could be referenced in any suitable timeframe.

Communication circuitry 212 may be configured for managing wired or wireless communications for the transfer of data in tiered software framework 200. The term "wireless" and its derivatives may be used to describe circuits, devices, systems, methods, techniques, communications channels, etc., that may communicate data through modulated electromagnetic radiation in a nonsolid medium. The term does not imply that the associated devices do not contain any wires, although in some embodiments they might not. Communication circuitry 212 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long Term Evolution (LTE) project along with any amendments, updates, and/or revisions (e.g., advanced LTE project, ultramobile broadband (UMB) project (also referred to as "3GPP2"), etc.). Communication circuitry 212 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 212 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 212 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 212 may operate in accordance with other wireless protocols in other embodiments. Communication circuitry 212 may include antennas to facilitate wireless communications and/or to receive other wireless communications.

In some embodiments, communication circuitry 212 may manage wired communications, such as electrical, optical, or any other suitable communication protocols (e.g., the Ethernet, Internet). Communication circuitry 212 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a WANs (e.g., the Internet).

In various embodiments, tiers 102 may be partitioned into a backend 214 and a frontend 216. Backend 214 may comprise tier-1 backend 214-1, tier-2 backend 214-2, and tier-3 backend 214-3 provisioned in one or more servers 204. Likewise, frontend 216 may comprise tier-1 frontend 216-1, tier-2 frontend 216-2, and tier-3 frontend 216-3 provisioned in one or more computing devices 206. Backend 214 may comprise various modules, logic, software engines and other components that are distributed (and common) across all users of tiered software framework 200. Backend 214 may execute operations for managing and processing data, performing computations, and facilitating communication between different components, such as components of snapshot application 100. In particular embodiments, backend 214 may include operations such as data management, business logic (e.g., snapshot application 100), user authentication and authorization, security and validation, APIs with third-party components such as web crawlers, payment processors, etc.

In a general sense, frontend 216 comprises at least a user interface using which human users interact with tiered software framework 200. Frontend 216 may also include libraries, forms, device integrators and other components as desired and based on particular needs. Frontend 216 may be presented on a suitable display device coupled to computing device 206 and appropriate to show visual indicators, such as a heads-up display, a computer monitor, a projector, a touchscreen display, a liquid crystal display (LCD), a light-emitting diode display, and/or a flat panel display. In various embodiments, frontend 216 may be specific to the particular one of tier 102. For example, frontend 216-1 at tier-1 may comprise certain functionalities available (and visible) only to subscriber 104-1, e.g., SaaS provider, software developer. Frontend 216-2 at tier-2 may comprise certain functionalities available (and visible) only to tier-2 subscriber 104-2. Frontend 216-3 at tier-3 may comprise certain functionalities available (and visible) only to tier-3 subscriber 104-3.

Tiered software framework 200 described and shown herein (and/or its associated structures) may also include suitable interfaces for receiving, transmitting, and/or otherwise communicating data or information in a network environment. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Figure 3:
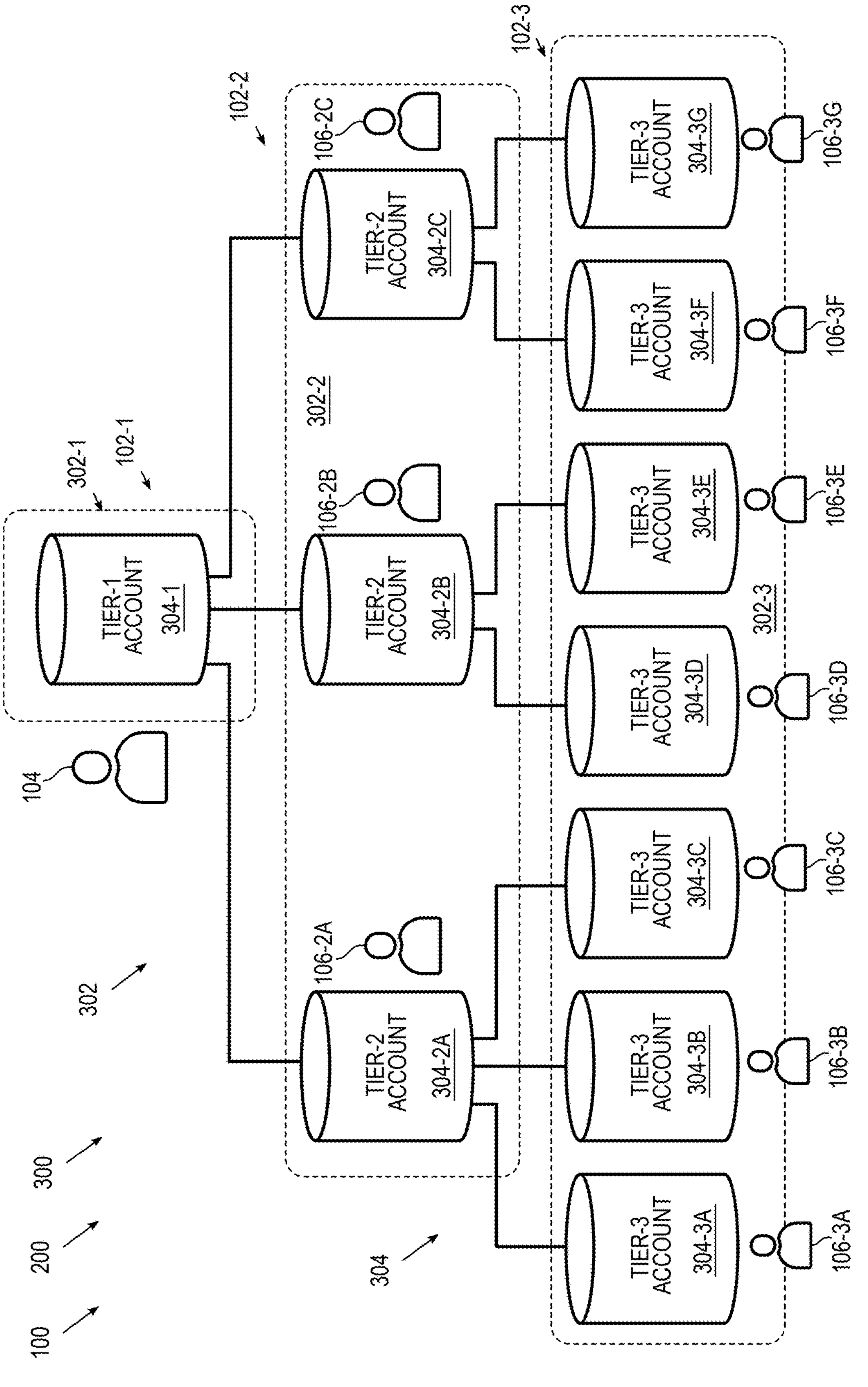
FIG. 3 is a simplified block diagram illustrating various details of a tiered software framework in an example system for replicating a marketing campaign.

FIG. 3 is a simplified block diagram illustrating example details of data hierarchy 300 of tiered software framework 200 implementing snapshot application 100, according to some embodiments of the present disclosure. In various embodiments, data 302 communicated in tiered software framework 200 may be exclusively received from users such as subscriber 104-1 and subscribers 104-2, and 104-3; in some other embodiments, data 302 may also be received from other sources, such as third parties and/or from the Internet. Examples of data 302 include business niche targeted by subscribers 104, marketing activities such as on social media, target audience of subscribers 104, login credentials to access various marketing platforms, frequency of marketing activities, information to be included in the content of marketing posts, customer lists, business locations, marketing platform rules, and other such data relevant to the functionalities offered by tiered software framework 200. Data 302 may be stored in data lakes, databases, data warehouses, blockchains, file systems and other types of data storage facilities within the broad scope of the embodiments with corresponding accessing and viewing capabilities as described herein. In various embodiments, assets 114 may be subsets of data 302.

Data 302 in each tier 102 may be contained within accounts 304 accessible and viewable with appropriate access credentials. For example, account 304-1 may be associated with subscriber 104-1. Account 304-1 may manage a plurality of accounts 304-2 at tier 102-2. Subscriber **104-2*a* may have a subscription to account 304-2*a* in plurality of accounts 304-2. Account 304-2*a* may manage a plurality of accounts 304-3 at tier 102-3. Subscriber 104-3*a* may have a subscription to account 304-3*a* in plurality of accounts 304-3; subscriber 104-3*b* may have a subscription to account 304-3*b* in plurality of accounts 304-3; and subscriber 104-3*c* may have a subscription to account 304-3*c* in plurality of accounts 304-3. In other words, subscriber 104-2*a* has three downstream subscribers at tier 102-3, namely subscribers 104-3*a*, 104-3*b*, and 104-3*c* with their associated respective accounts 304-3*a*, 304-3*b*, and 304-3*c*. Likewise for other accounts shown in the figure. Note that such a framework is merely provided for illustrative purposes and should not be construed as a limitation. Any number of subscribers may be provided at tiers 102-2 and 102-3 in tiered software framework 200** within the broad scope of the embodiments.

In various embodiments, data 302 may be arranged in data hierarchy 300 for different accounts 304 such that certain users can view and access only a subset of data 302 according to their respective tier 102 and access credentials based on particular needs (e.g., user credentials may indicate which tier 102 and which corresponding accounts 304 are available for access and view). Such accounts 304 may be facilitated by a suitable user interface at frontend 216 for viewing the accessible data. Appropriate user authentication and authorization engines running in backend 214 may ensure that accounts 304 are maintained as desired and appropriate privacy blocks are applied at appropriate tiers 102.

In the example illustrated herein, tier-1 data 302-1 may be of account 304-1; tier-2 data 302-2 may be of accounts **304-2*a*, 304-2*b* and 304-2*c* corresponding to subscribers 104-2*a*, 104-2*b* and 104-2*c*, respectively; tier-3 data 302-3 may be of accounts 304-3*a* . . . 304-3*g* corresponding to subscribers 104-3*a* . . . 104-3*g*. Subscribers 104-3*a* . . . 104-3*g* may access and view their own respective accounts 304-3*a* . . . 304-3*g*; however, they cannot access or view other accounts 304 in the same tier 102-3 or in upstream tiers 102-2 or 102-1. Note that accessing and viewing an account refers to accessing and viewing the data of the account. Subscribers 104-2*a* . . . 104-2*c* at tier 102-3 may access and view their own respective accounts 304-2*a* . . . 304-2*c* as well as downstream accounts 304-3 of their respective subscribers 104-3; however, they cannot access or view other accounts 304-2 in the same tier 102-2, or in downstream tier 102-3 not associated with their downstream subscribers 104-3, or in upstream tier 102-1. For example, subscriber 104-2*a* may access and view accounts 304-2*a*, 304-3*a*, 304-3*b*, and 304-3*c*; subscriber 104-2*b* may access and view accounts 304-2*b*, 304-3*d*, and 304-3*e*; subscriber 104-2*c* may access and view accounts 304-2*c*, 304-3*f*, and 304-3*g*. Subscriber 104-1 at tier 102-1 may access and view accounts 304-1 at tier 102-1, 304-2*a* . . . 304-2*c* at tier 102-2, and 304-3*a* . . . 304-3*g* at tier 102-3**.

Figure 4:
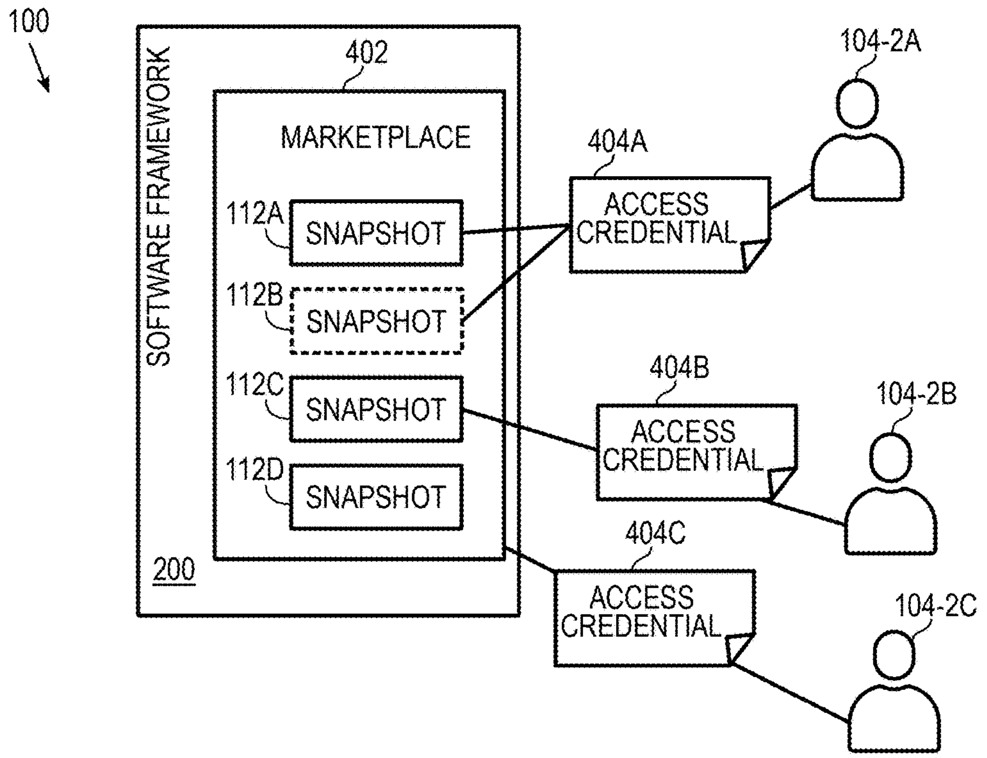
FIG. 4 is a simplified diagram illustrating various details of an example system for replicating a marketing campaign in a tiered software framework.

FIG. 4 is a simplified diagram illustrating example details of snapshot application 100 in tiered software framework 200 according to various embodiments. Tiered software framework 200 may implement a marketplace 402 to facilitate sharing one or more snapshot 112. Merely for illustrative purposes, and not as a limitation, assume that tier-2 subscribers **104-2*a*, 104-2*b* and 104-2*c* access marketplace 402 using respective access credentials 404*a*, 404*b* and 404*c*. Assume that subscribers 104-2*a*, 104-2*b*, and 104-2*c* have respective accounts 304-2*a*, 304-2*b*, and 304-2*c*, which are not shown in the figure to prevent clutter. Subscriber 104-2*a* has created snapshots 112*a* and 112*b*; subscriber 102-2*b* has created snapshot 112*c*; and a third-party (not shown) has created and published snapshot 112*d* for sale on marketplace 402. In some embodiments, subscriber 104-2*a* may allow snapshot 112*a* to be visible to all visitors to marketplace 402, whereas snapshot 112*b* may be visible only to subscribers 104-3 of subscriber 104-2*a*'s account 304-2*a*. The difference in visibility between snapshot 112*a* and snapshot 112*b* is represented by dotted lines of snapshot 112*b* in the drawing. Snapshot 112*b* may not be visible to subscriber 104-2*b* and subscriber 104-2*c*. Snapshots 112*a*, 112*c*, and 112*d* may be visible to subscribers 104-2*a*, 104-2*b*, and 104-2*c***.

Merely for example purposes, assume that subscriber **104-2*c* purchases snapshot 112*c* on marketplace 402. Accordingly, snapshot publisher 136 executing in account 304-2*b* of subscriber 104-2*b* may push snapshot 112*c* to account 304-2*c* of subscriber 104-2*c* via a sharable link in some embodiments. The sharable link may point to the location of snapshot 112*c* and may also include information on access permissions of subscriber 104-2*c*. Snapshot importer 152 executing in account 304-2*c* of subscriber 104-2*c* may receive the link and store it appropriately. Snapshot publisher 136 executing in account 304-2*c* of subscriber 104-2*c* may subsequently push the link to snapshot executors 150 in accounts 304-3*c*** of its subscribers

104-3 at tier 102-3. During operation, snapshot executor 150 executing in one of accounts 304-3*c* may access and execute snapshot 112*c* at the link suitably. Such sharing options may prevent duplication of files and other digital material in tiered software framework 200.

Figure 5:
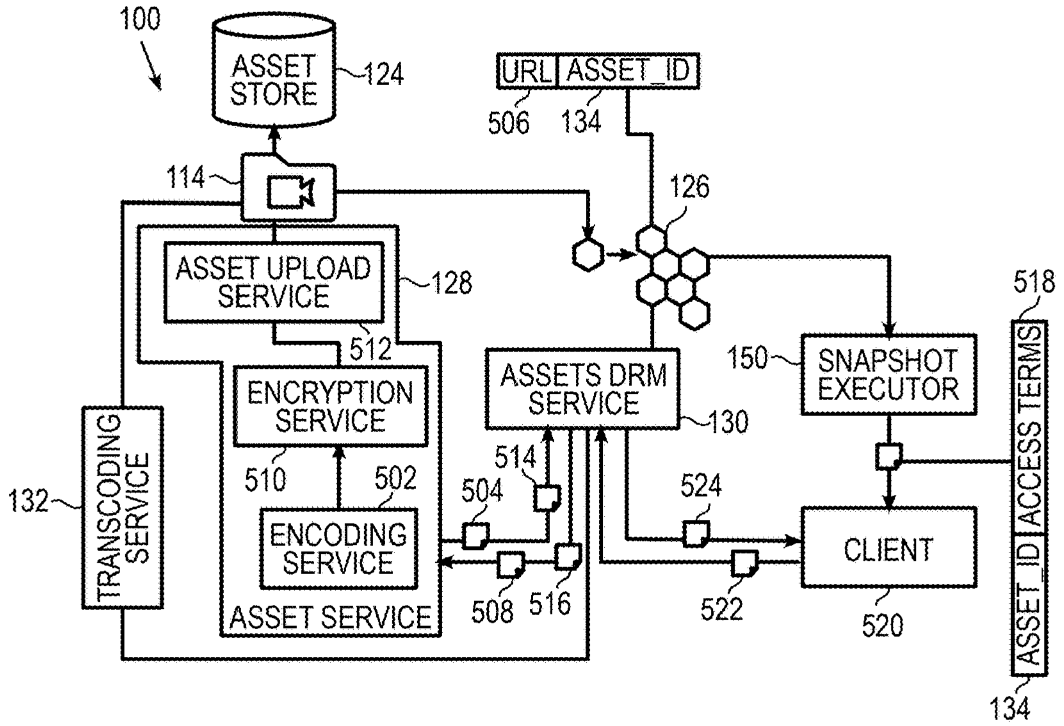
FIG. 5 is a simplified diagram illustrating various details of an example system for replicating a marketing campaign in a tiered software framework.

FIG. 5 is a simplified block diagram illustrating various implementation details of snapshot application 100 according to an example embodiment. Given the immutable nature of videos, images and other such assets 114, rather than generating multiple copies, a global storage solution can be established for subscribers 104. In this setup, assets 114 may be linked to a DRM layer, which effectively oversees access permissions for various locations. Accordingly, an encoding service 502 running in asset service 128 may send a request 504 to assets DRM service 130, requesting a signed URL for asset 114. In response, assets DRM service 130 may reserve a memory space (e.g., create a document, assign folder 144 in bucket 140, etc.) at a URL 506 that points to the memory location in a cloud server (e.g., CDN 142), and add URL 506 to asset collection 126. Assets DRM service 130 may sign URL 506 appropriately and send a response 508 back to assets service 128 with the requested signed URL. In various embodiments, the signed URL contains authentication information in its query string in addition to URL 506. The signed URL also specifies the read, write, download and other access permissions to access asset 114 at URL 506. In various embodiments, the signed URL in response 508 may allow upload of asset 114 to URL 506.

Subsequent to receiving response 508, an encryption service 510 in assets service 128 may encrypt asset 114 suitably. In some embodiments, encryption service 510 may be absent and asset 114 may not be encrypted. An asset upload service 512 in assets service 128 may upload asset 114 to the location specified by URL 506. asset store 124. Subsequent to uploading asset 114 in asset store 124, assets service 128 may send a status update 514 to assets DRM service 130 with the uploaded status and receive another response 516 from assets DRM service 130 with asset identifier 134. Asset collection 126 be configured as a data structure in which asset identifiers 134 are associated one-to-one with corresponding URL 506. Assets DRM service 130 may emit a video/audio transcoding event to transcoding service 132 on successful upload. Transcoding service 132 may generate different formats of asset 114 at URL 506.

Snapshot executor 150 may send asset identifier 134 and access terms 518 to a client 520 as part of implementing snapshot 112 which includes asset 114. Access terms 518 may specify how many times client 520 is allowed to access 514; or which devices may be used; etc. Client 520 may be a browser, an email application, etc. Client 520 may send a request 522 to assets DRM service 130 with asset identifier 134 and access terms 518. Assets DRM service 130 may associate URL 506 with asset 114 using asset identifier 134, sign URL 506 according to access terms 518, and send the signed URL to client 520 in a response 524. Client 520 may thereafter fetch asset 114 from asset store 124 at URL 506 using the authentication means of the signed URL.

In various embodiments, communication to assets DRM service 130, such as requests 504, 522, status update 514, etc. may be in the form of XML API requests. In other embodiments, other formats may be used suitably without departing from the scope of the embodiments.

Figure 6:
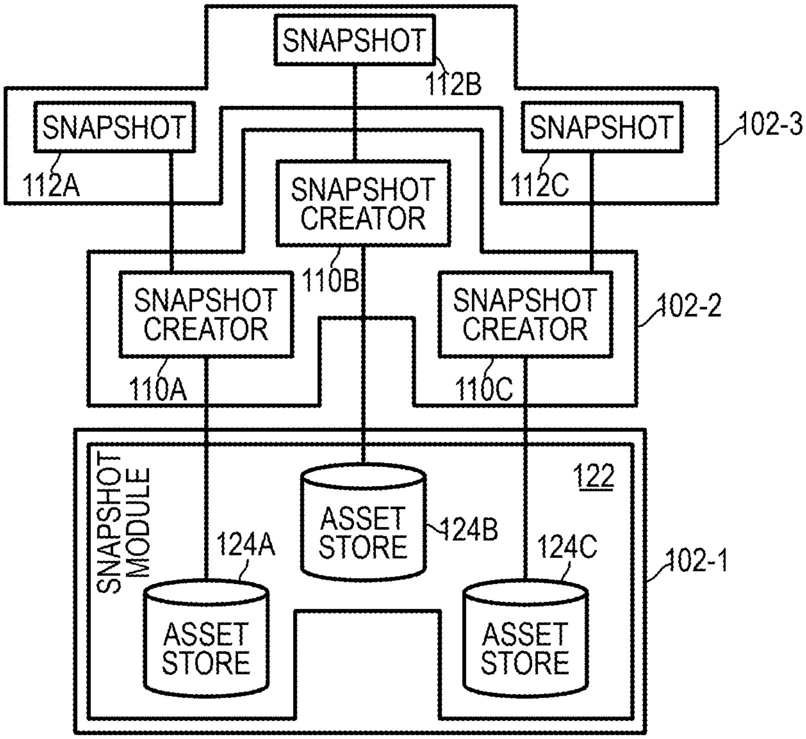
FIG. 6 is a simplified block diagram illustrating various details of an example system for replicating a marketing campaign in a tiered software framework.

FIG. 6 is a simplified block diagram illustrating example details of snapshot application 100 according to some embodiments. In various embodiments, different accounts 304 at various tiers may be associated with different instances of various modules. Merely for example purposes and so as not to clutter the drawing, snapshot creator 110, snapshot 112, snapshot module 122, and asset store 124 are shown and described in the figure. Other modules and/or elements may be provisioned in different tiers accordingly. In the example shown, snapshot module 122 with asset store 124 may be implemented at tier 102-1. Snapshot creator 110 may be implemented at tier 102-2. Snapshot 112 may be stored at tier 102-3.

Each account 304-2*a*, 304-2*b* and 304-2*c* (not shown to prevent clutter) at tier 102-2 may be associated with separate instances of snapshot creator 110, namely snapshot creator 110*a* in account 304-2*a*; snapshot creator 110*b* in account 304-2*b*; and snapshot creator 110*c* in account 304-2*c*. Although three different instances are shown as existing separately simultaneously, in actuality, each instance may be instantiated only when called and they may execute asynchronously independently of each other. Likewise, other elements, such as snapshot publisher 136, and snapshot importer 152 may also execute independently in the separate accounts at tier 102-2.

Assets 114 of snapshot creator 110*a* may be stored in asset store 124*a* at tier 102-1; assets 114 of snapshot creator 110*b* may be stored in asset store 124*b* at tier 102-1; and assets 114 of snapshot creator 110*c* may be stored in asset store 124*c* at tier 102-1. In various embodiments, although three different asset stores 124*a*-124*c* are shown, such is merely for illustrative purposes; in various implementations, assets 114 may all be stored in a common database, and differentiated into the different accounts using suitable data structures and identifiers. Other elements of snapshot module 122 may likewise be provisioned at tier 102-1.

Snapshot 112*a* associated with account 304-2*a* may be stored at account 304-3*a* (not shown to prevent clutter) of subscriber 104-3*a* (not shown to prevent clutter) at tier 102-3. Note that although only one instance of snapshot 112*a* is shown, any number of instances thereof may be provisioned within the scope of the embodiments. Likewise, snapshot 112*b* associated with account 304-2*b* may be stored at account 304-3*b* (not shown to prevent clutter) of subscriber 104-3*b* (not shown to prevent clutter) at tier 102-3. Snapshot 112*c* associated with account 304-2*c* may be stored at account 304-3*c* (not shown to prevent clutter) of subscriber 104-3*c* (not shown to prevent clutter) at tier 102-3. In some such embodiments, each account 304 may operate as a separate container at tier 102-2 executing separate instances of snapshot creator 110, etc.; but may execute as separate threads at tier 102-1 for each function call from a separate account.

Figure 7:
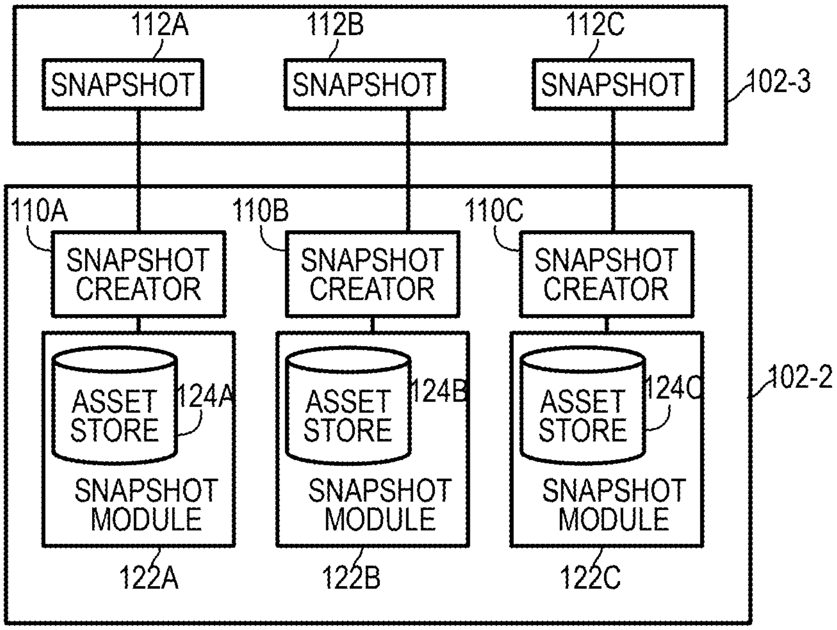
FIG. 7 is a simplified block diagram illustrating various details of an example system for replicating a marketing campaign in a tiered software framework.

FIG. 7 is a simplified block diagram illustrating example details of snapshot application 100 according to some embodiments. In various embodiments, different accounts 304 at various tiers may be associated with different instances of various modules. Merely for example purposes and so as not to clutter the drawing, snapshot creator 110, snapshot 112, snapshot module 122, and asset store 124 are shown and described in the figure. Other modules and/or elements may be provisioned in different tiers accordingly. In the example shown, snapshot module 122 with asset store 124 and snapshot creator 110 may be implemented at tier 102-2. Snapshot 112 may be stored at tier 102-3.

Each account 304-2*a*, 304-2*b* and 304-2*c* (not shown to prevent clutter) at tier 102-2 may be associated with separate instances of snapshot creator 110 and snapshot module 122, namely snapshot creator 110*a* and snapshot module 122*a* in account 304-2*a*; snapshot creator 110*b* and snapshot module 122*b* in account 304-2*b*; and snapshot creator 110*c* and snapshot module 122*c* in account 304-2*c*. Although these different instances are shown as existing separately simultaneously, in actuality, each instance may be instantiated only when called and they may execute asynchronously independently of each other. Likewise, other elements, such as snapshot publisher 136, and snapshot importer 152 may also execute independently in the separate accounts at tier 102-2.

Assets 114 of snapshot creator 110*a* may be stored in asset store 124*a* at tier 102-2; assets 114 of snapshot creator 110*b* may be stored in asset store 124*b* at tier 102-2; and assets 114 of snapshot creator 110*c* may be stored in asset store 124*c* at tier 102-2. In various embodiments, although three different asset stores 124*a*-124*c* are shown, such is merely for illustrative purposes; in various implementations, assets 114 may all be stored in a common database, and differentiated into the different accounts using suitable data structures and identifiers. Other elements of snapshot module 122 may likewise be provisioned at tier 102-2.

Snapshot 112*a* associated with account 304-2*a* may be stored at account 304-3*a* (not shown to prevent clutter) of subscriber 104-3*a* (not shown to prevent clutter) at tier 102-3. Note that although only one instance of snapshot 112*a* is shown, any number of instances thereof may be provisioned within the scope of the embodiments. Likewise, snapshot 112*b* associated with account 304-2*b* may be stored at account 304-3*b* (not shown to prevent clutter) of subscriber 104-3*b* (not shown to prevent clutter) at tier 102-3. Snapshot 112*c* associated with account 304-2*c* may be stored at account 304-3*c* (not shown to prevent clutter) of subscriber 104-3*c* (not shown to prevent clutter) at tier 102-3. In some such embodiments, each account 304 may operate as a separate container, executing separate instances of snapshot module 122, asset store 124, snapshot creator 110, etc.

Figure 8:
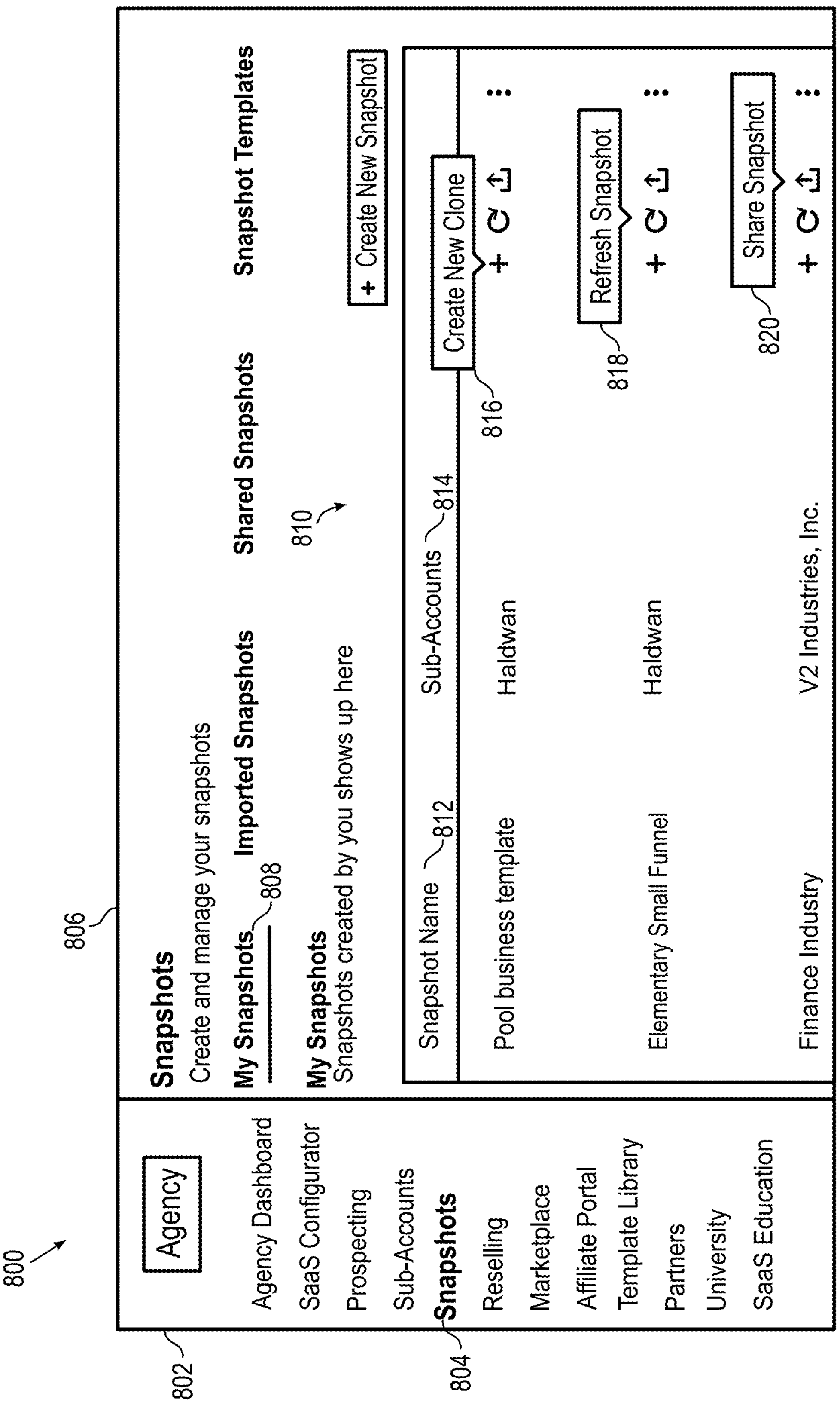
FIG. 8 is a simplified diagram illustrating an example user interface associated with a system for replicating a marketing campaign in a tiered software framework.

FIG. 8 is a simplified diagram illustrating an example user interface 800 in snapshot application 100 according to some embodiments. User interface 800 may include a sidebar 802 comprising various functionalities that are available in tiered software framework 200. Each functionality may be selectable by the user, who has access credentials at either tier 102-2 or 102-3. One such functionality may be functionality 804, "snapshot." Selecting functionality 804 may open a content area 806, displaying various options available for functionality 804. One of the options may allow the user to select option 808, "My Snapshot" that opens content area 810, displaying snapshots 112 created by the user. Content area 810 may display snapshots 112 in an array format, with column 812 specifying the snapshot name and column 814 specifying the sub-accounts (e.g., accounts of tier 102-3 subscribers 104-3 to the user's account) that have access to the corresponding snapshot. Various interactive elements 816, 818 and 820 may allow the user to create new clones, refresh snapshots, and share snapshots 112, respectively.

Interactive element 816 "Create New Clone" may allow the user to quickly replicate the selected one of snapshot 112, enabling the creation of multiple identical instances with consistent assets and configurations. Interactive element 818 "Refresh Snapshot" may update the selected snapshot to reflect the current version of the parent account at the same tier 102 as the user, or at an upstream tier, as the case may be, incorporating any changes made since the last update of the selected snapshot. Interactive element 820 "Share Snapshot" may enable deployment of the current version of the selected snapshot to all linked locations (e.g., accounts to which the selected snapshot was shared previously).

Figure 9A:
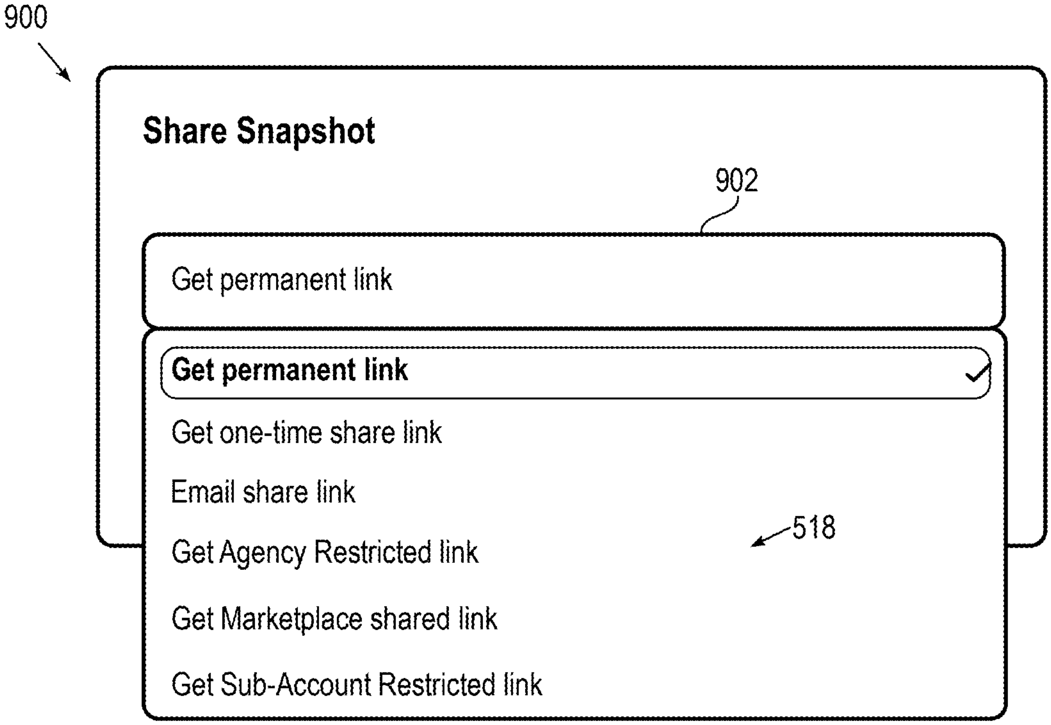
FIGS. 9A-9B are simplified diagrams illustrating other example user interfaces associated with a system for replicating a marketing campaign in a tiered software framework.
Figure 9B:
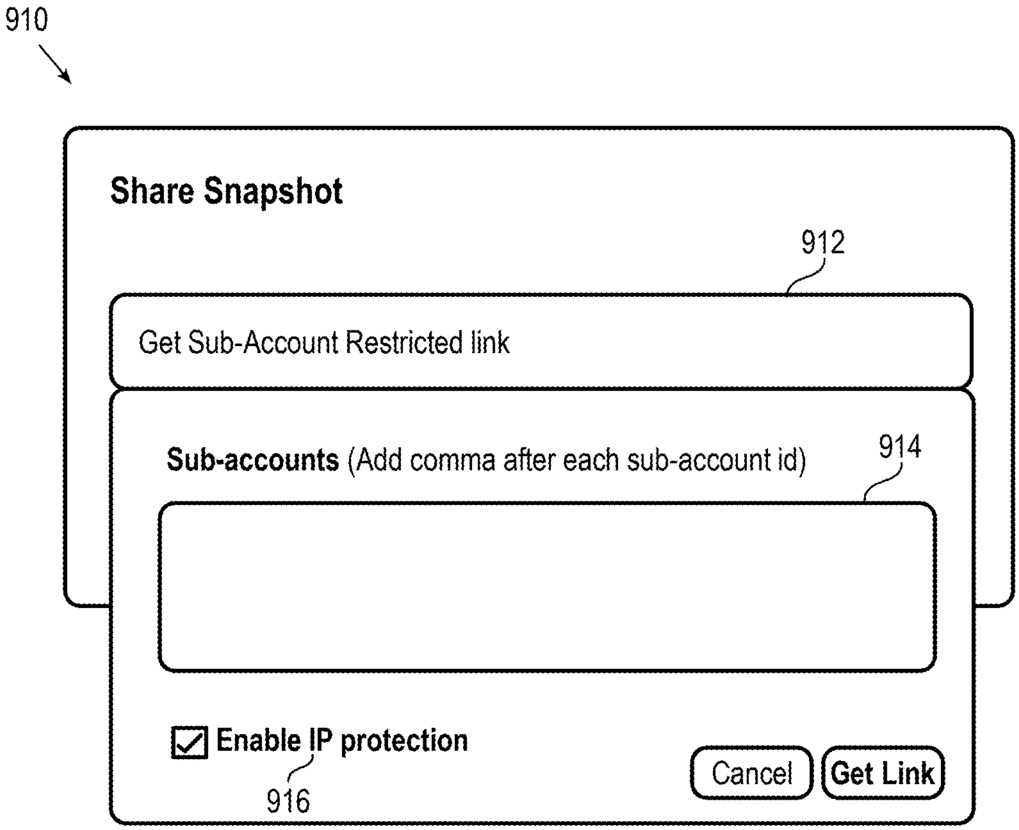

FIGS. 9A-9B are simplified diagrams illustrating various details of snapshot application 100 according to example embodiments. As shown in FIG. 9A, a window 900 may be displayed when the user clicks on "share snapshot" interactive element 820 described in reference to FIG. 8. Window 900 may include a drop down box 902 showing various options for sharing snapshot 112; the options provide access terms 518 for the link. Sharing with a "permanent link" may allow snapshot 112 to be imported an unlimited number of times by multiple accounts that have the share link. Sharing with a "one-time share link" allows snapshot 112 to be imported only once. After snapshot 112 is imported, the link is automatically invalidated. Sharing with an "agency-restricted link" may allow a specific account to receive the shared link, to the exclusion of all others. Sharing with a "marketplace share link" enable sharing snapshot 112 in marketplace 402, allowing it to be accessed and utilized by any subscriber 104-2 or 104-3 in tiered software framework 200.

Sharing with a "subaccount-restricted link" allows import of snapshot 112 by any account, but the snapshot can only be used within the specific subaccount specified at the time of sharing. Further details of sharing using the subaccount restricted link are provided in FIG. 9B. Selecting the "subaccount restricted link" opens a window 910 with a menu box 912 displaying the sharing option. An interactive element 914 may be displayed, for example, allowing the user to enter various subaccounts that are permitted to use snapshot 112. Another interactive element 916 may allow the user to select an option to enable intellectual property (IP) protection. Enabling IP protection allows the sharer to prevent further sharing or duplication of selected snapshot 112. For example, if the user selects the "enable IP protection" option, and thereafter shares snapshot 112 with account 304-2 at tier 102-2, the receiver account 304-2 can import and share snapshot 112 across several subaccounts that have been listed in interactive element 914. However, new clones cannot be created from the IP protected snapshot.

FIG. 10 is a simplified diagram illustrating an example user interface 1000 in snapshot application 100 according to some embodiments. User interface 1000 may include a sidebar 1002 comprising various functionalities that are available in tiered software framework 200. Each functionality may be selectable by the user, who has access credentials at either tier 102-2 or 102-3. One such functionality may be functionality 1004, "snapshot." Selecting functionality 1004 may open a content area 1006, displaying various options available for functionality 1004. One of the options may allow the user to select option 1008, "Imported Snapshot" that opens content area 1010, displaying snapshots 112 created by the user. Content area 1010 may display snapshots 112 in an array format, with column 1012 specifying the snapshot name and column 1014 specifying the sub-accounts (e.g., accounts of tier 102-3 subscribers 104-3 to the user's account) that have access to the corresponding snapshot. Various interactive elements 1016, 1018 and 1020 may allow the user to create new clones, edit snapshots, and duplicate snapshots 112, respectively.

In various embodiments, imported snapshots are displayed in content area 1010 after they are shared with the user's account from another account. For example, the user may be marketing agency Beta, and the imported snapshot may be shared by marketing agency Alpha. After being imported, the imported snapshots can be utilized to create new clones within the receiving account, allowing seamless integration of pre-built assets and configurations. For example, interactive element 1016 "+" may allow the user to quickly replicate the selected one of snapshot 112, enabling the creation of multiple identical instances with consistent assets and configurations.

Interactive element 1018 may enable the user to edit the selected snapshot according to the user's preferences. Imported snapshots may not be shared further, meaning they are restricted to use within the receiving account and cannot be distributed to other accounts. This ensures that the original creator maintains control over the distribution and use of their snapshot. However, the imported snapshots may be duplicated within the same account, using interactive element 820. The duplicated snapshot may then be modified as desired to generate another snapshot efficiently without having to start from scratch.

Figure 11:
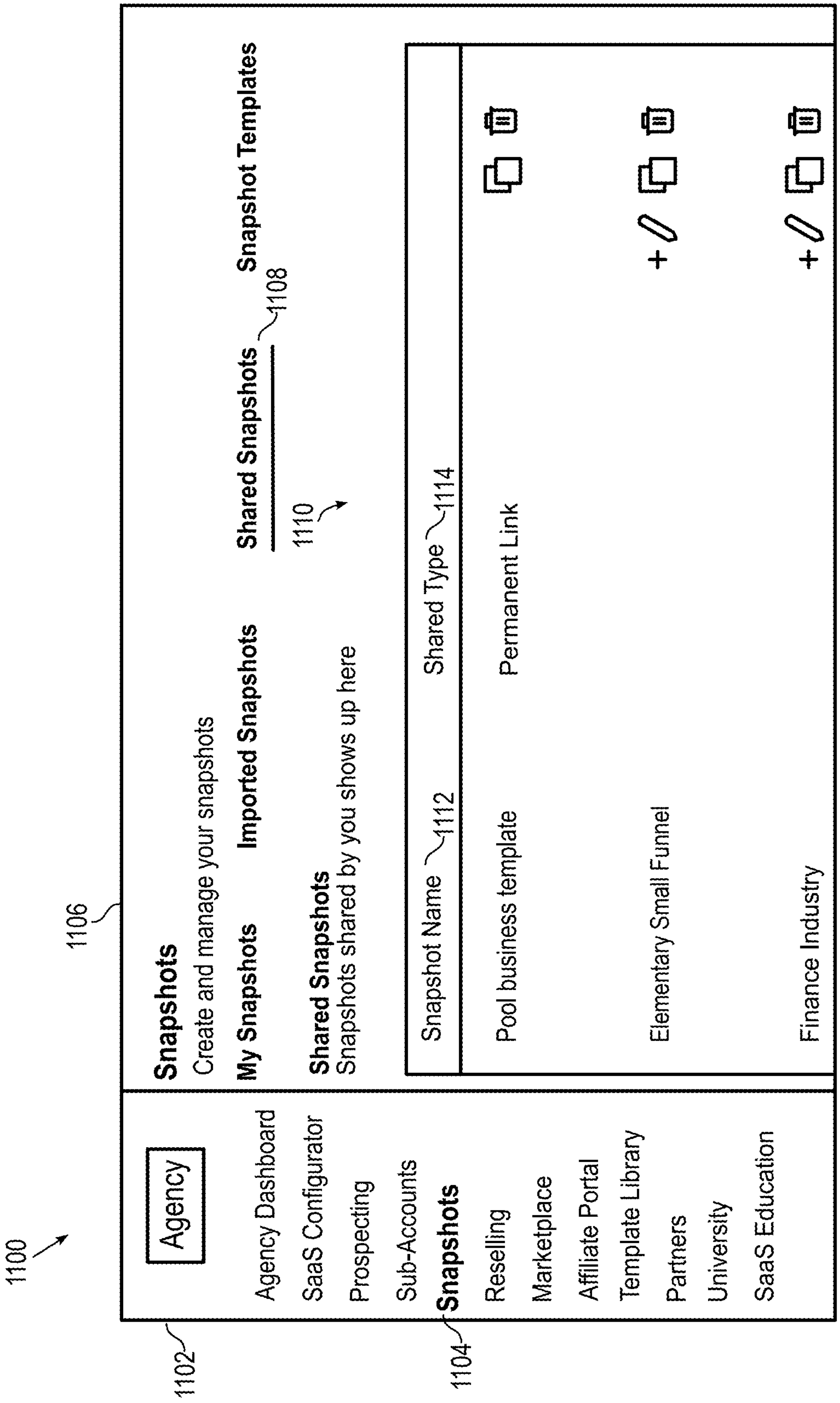
FIG. 11 is a simplified diagram illustrating yet another example user interface associated with a system for replicating a marketing campaign in a tiered software framework.

FIG. 11 is a simplified diagram illustrating an example user interface 1100 in snapshot application 100 according to some embodiments. User interface 1100 may include a sidebar 1102 comprising various functionalities that are available in tiered software framework 200. Each functionality may be selectable by the user, who has access credentials at either tier 102-2 or 102-3. One such functionality may be functionality 1104, "snapshot." Selecting functionality 1104 may open a content area 1106, displaying various options available for functionality 1104. One of the options may allow the user to select option 1108, "Shared Snapshots" that opens content area 1110, displaying snapshots 112 shared with other accounts by the user. Content area 1110 may display snapshots 112 in an array format, with column 1112 specifying the snapshot name and column 1114 specifying the share type (e.g., permanent link, one-time share link, etc.). In some embodiments, as shown, all snapshots 112 created in the user's account may be visible in 1110, and data in column 1114 may indicate whether or not it is shared. In the example shown, only one out of the three snapshots is shared. After sharing, the snapshots may not be edited further in some embodiments. These features may facilitate tracking the snapshots that have been distributed.

Figure 12:
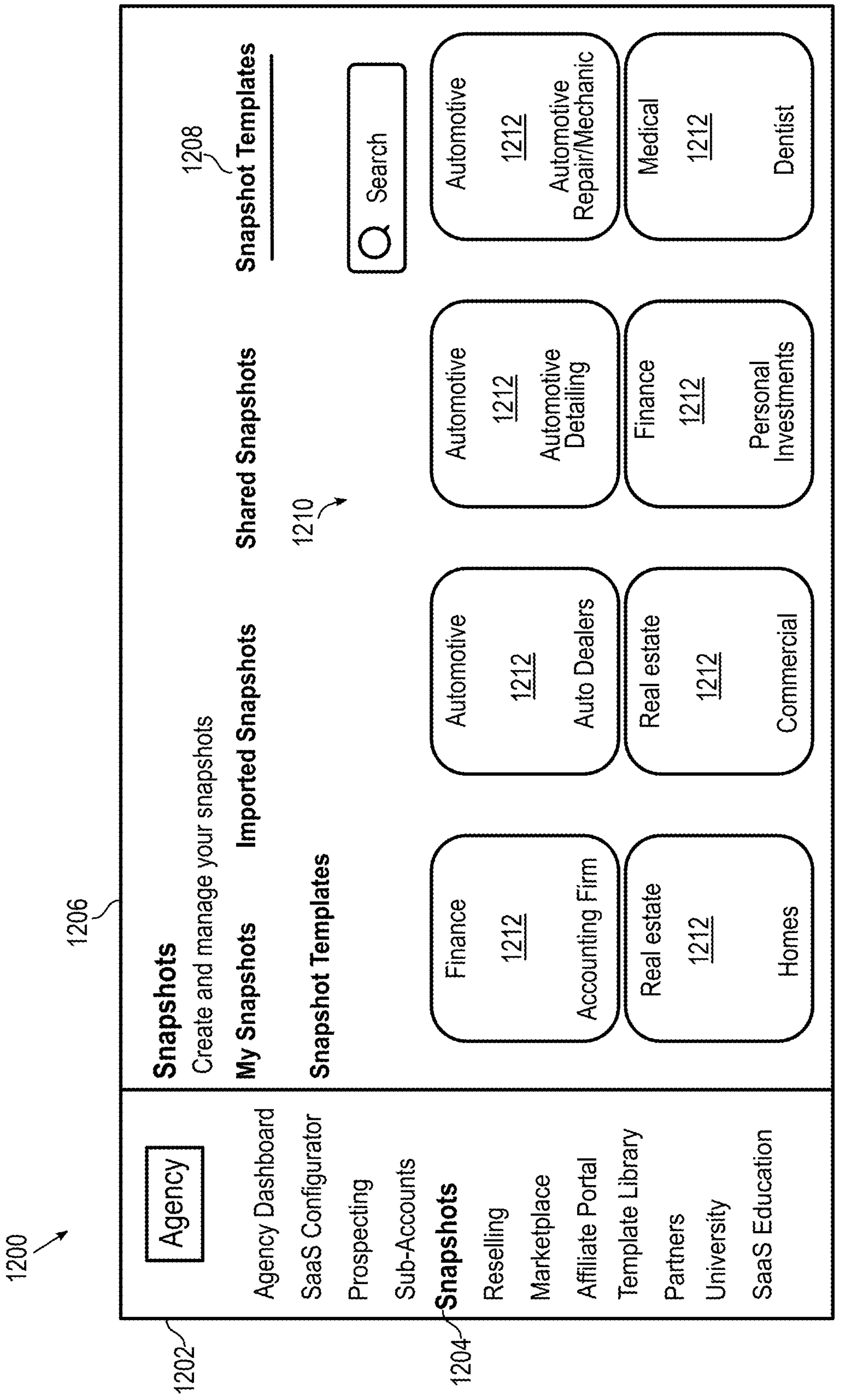
FIG. 12 is a simplified diagram illustrating yet another example user interface associated with a system for replicating a marketing campaign in a tiered software framework.

FIG. 12 is a simplified diagram illustrating an example user interface 1200 in snapshot application 100 according to some embodiments. User interface 1200 may include a sidebar 1202 comprising various functionalities that are available in tiered software framework 200. Each functionality may be selectable by the user, who has access credentials at either tier 102-2 or 102-3. One such functionality may be functionality 1204, "snapshot." Selecting functionality 1104 may open a content area 1206, displaying various options available for functionality 1204. One of the options may allow the user to select option 1208, "Snapshot Templates" that opens content area 1210, displaying various pre-built templates 1212 in tiered software framework 200. Content area 1210 may display templates 1212 in an array format with thumbnail views that are clickable. Various other configurations, such as list display, table display, etc. may also be included within the scope of the embodiments.

Snapshot templates 1212 may be structured and preconfigured for use by any account in tiered software framework 200. Each one of templates 1212 may cater to a different niches or category of business. For example, one template 1212 may be suitable for accounting firms; another template 1212 may be suitable for automotive detailing businesses. Users can quickly create customized snapshots starting from these preconfigured templates 1212 with minimal setup effort, making it easier to launch services tailored to specific industries or needs.

Although the present disclosure has been described in detail with reference to particular arrangements and configurations, these example configurations and arrangements may be changed significantly without departing from the scope of the present disclosure. For example, although the present disclosure has been described with reference to particular network systems such as cloud networks, snapshot application 100 may be applicable to other networks such as LANs. Moreover, although tiered software framework 200 has been illustrated with reference to particular elements and operations that facilitate the software process, these elements, and operations may be replaced by any suitable architecture or process that achieves the intended functionality of snapshot application 100.

Example Methods

Figure 13:
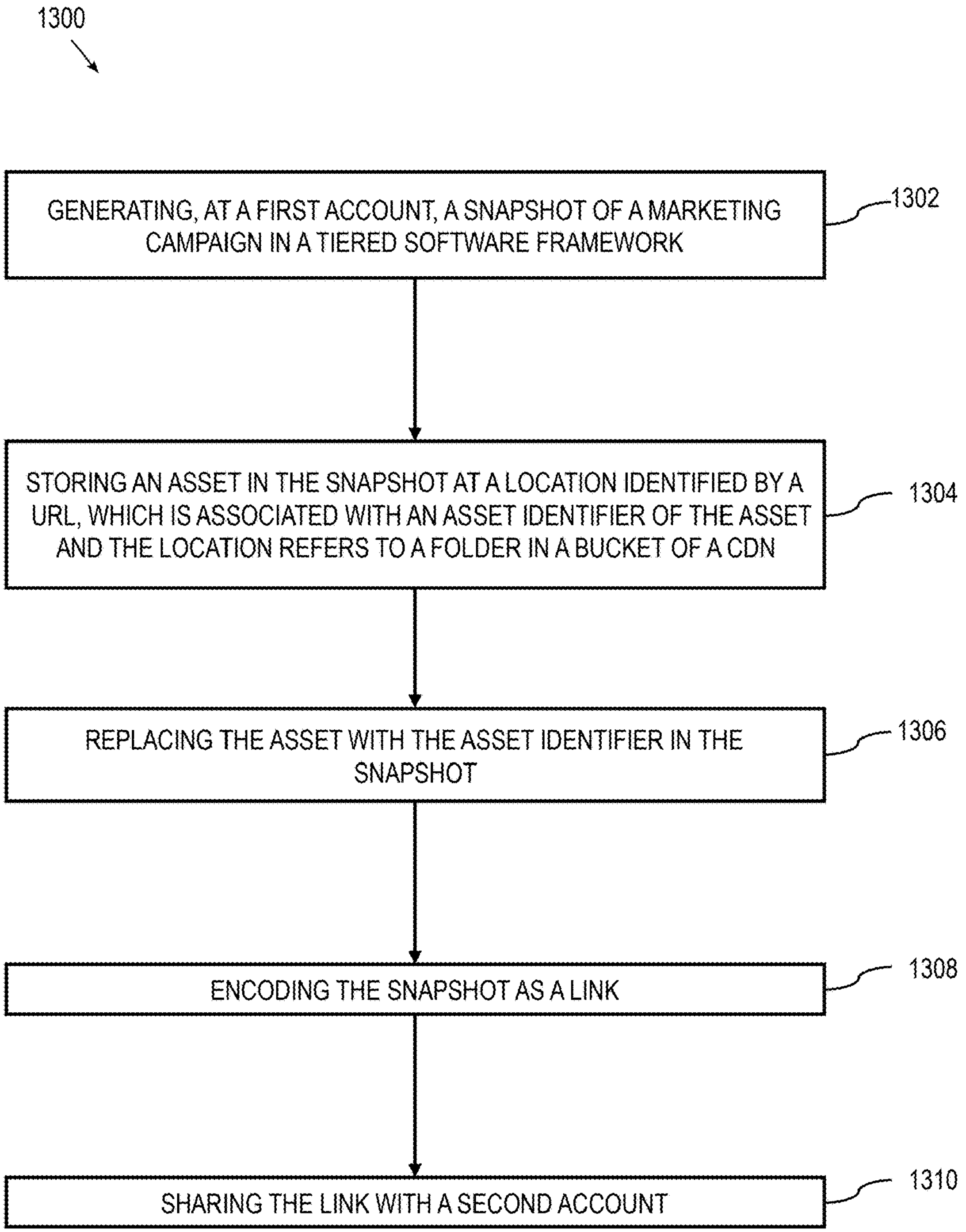
FIG. 13 is a simplified flow diagram illustrating various operations associated with an example method for replicating a marketing campaign in a tiered software framework.

FIG. 13 is a simplified flow diagram illustrating example operations 1300 associated with snapshot application 100, according to some embodiments. At 1302, snapshot creator 110 may generate, at a first account 304, say 304-2*a*, snapshot 112 of a marketing campaign in tiered software framework 200. Snapshot 112 may be generated by any known means, for example, by crafting a marketing campaign and specifying various configurations thereof. The marketing campaign may include funnels, emails, advertisements, social media posts and actions for sending them at specific times, capturing customer interactions, generating leads, etc. In some embodiments, the marketing campaign may be generated by a human, and snapshot creator 110 may create snapshot 112 therefrom upon receiving suitable instructions. In some embodiments, an artificial intelligence engine may automatically create the marketing campaign (or portions thereof), and instruct snapshot creator 110 to generate snapshot 112 suitably.

At 1304, assets service 128 may store asset 114 in snapshot 112 at a location in asset store 124, the location being identified by URL 506. URL 506 may be associated with asset identifier 134 of asset 114 and the location may refer to folder 144 in bucket 140 in CDN 142, comprising asset store 124. The storing may be accomplished by uploading asset 114 to the location using a signed URL. The signed URL comprises URL 506 with access terms, such as read permission, write permission, etc. The signed URL may also include authentication means (such as login credentials) to verify that the upload is from the appropriate account 304-2*a*.

At 1306, asset 114 may be replaced with asset identifier 134 in snapshot 112. Replacing asset 114 with asset identifier 134 may save memory space in snapshot 112. Instead of data comprising asset 114, only text string of asset identifier 134 may be saved in snapshot 112. At 1308, snapshot publisher 136 may encode snapshot 112 as a link. At 1310, snapshot publisher 136 may share the link with a second account 304, say 304-2*b* at tier 102-2 or account 304-3*a* at tier 102-3. The link may be shared upon user selection of a suitable interactive element as described in reference to FIG. 8. The link may be shared as a permanent link, a one-time share link, a marketplace link, etc., as described in reference to FIG. 9.

Figure 14:
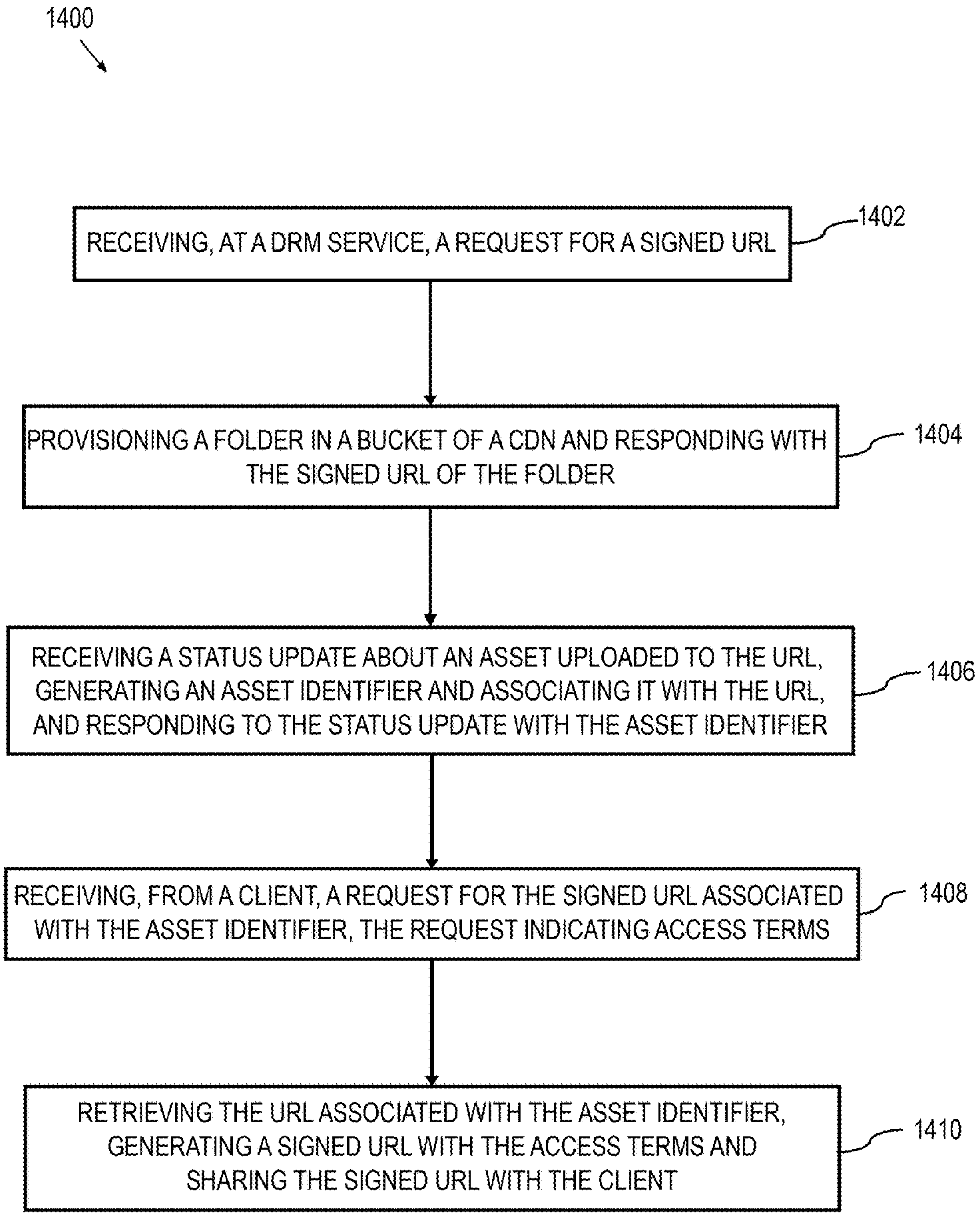
FIG. 14 is a simplified flow diagram illustrating various operations associated with another example method for replicating a marketing campaign in a tiered software framework.

FIG. 14 is a simplified flow diagram illustrating example operations 1400 associated with snapshot application 100, according to some embodiments. At 1402, assets DRM service 130 may receive request 504 for a signed URL. At 1404, assets DRM service 130 may provision folder 144 at URL 506 in bucket 140 in CDN 142, and respond to 504 with a response 508 comprising a signed URL including URL 506. In some embodiments, assets DRM service 130 may query the CDN for the URL, and the appropriate services in CDN 142 may provision bucket 140 suitably, returning URL 506 to assets DRM service 130. At 1406, assets DRM service 130 may receive status update 514 from assets service 128, indicating that asset 114 has been uploaded to URL 506. Responsive to receiving status update 514, assets DRM service 130 may generate asset identifier 134, associate it with URL 506 in asset collection 126 and send response 516 comprising asset identifier 134.

At 1408, assets DRM service 130 may receive, from client 520, request 522 for the signed URL associated with asset identifier 134, along with access terms to asset 114. At 1410, assets DRM service 130 may retrieve URL 506 associated with asset identifier 134, generate a signed URL with the access terms in request 522 and share the signed URL with client 520 in response 524.

In various embodiments, substantially most operations described in FIGS. 13-14 are performed automatically without human intervention. Although FIGS. 13-14 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 13-14 may be modified in accordance with the present disclosure to automatically replicate marketing campaign from snapshot 112 as disclosed herein. Although various operations are illustrated in FIGS. 13-14 once each, the operations may be repeated as often as desired.

It is important to note that the operations described with reference to the preceding figures illustrate only some of the possible scenarios that may be executed by, or within, snapshot application 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion.

SELECT EXAMPLES

Example 1 provides a method for replicating marketing campaigns in a tiered software framework, the method including: generating, at a first account, a snapshot of a marketing campaign in a tiered software framework, in which: the tiered software framework comprises a plurality of tiers separated by data access policies such that data at a first tier is accessible at a second tier and data at the second tier is not accessible at the first tier, and the snapshot is generated at the second tier for a marketing campaign to be executed at the first tier; storing an asset in the snapshot at a location identified by a signed uniform resource locator (URL), in which: the signed URL is associated with an asset identifier, and the location refers to a folder in a bucket of a content delivery network (CDN); replacing the asset with the asset identifier in the snapshot; encoding the snapshot as a link; and sharing the link with a second account.

Example 2 provides the method of example 1, the method further including: sending a request for the signed URL to a digital rights management (DRM) service; receiving the signed URL from the DRM service in response to the request; responsive to receiving the signed URL from the DRM service, uploading the asset to the signed URL; subsequent to uploading the asset, sending a status update to the DRM service; and receiving the asset identifier from the DRM service in response to the status update.

Example 3 provides the method of example 2, in which: the status update includes information on playback and access rights associated with the asset, the information is stored against the signed URL in an asset collection, and the asset identifier encodes the information through the association with the signed URL.

Example 4 provides the method of example 1, further including: identifying a conflict for the asset in the second account, wherein the conflict is identified based on an origin identifier of the asset in the second account; displaying a selection to retain or replace the asset in the second account; and skipping the asset, or replacing the asset according to the selection when pushing the snapshot from the first account to the second account.

Example 5 provides the method of example 1, in which the first account and the second account are at the second tier.

Example 6 provides the method of example 1, further including sharing the link simultaneously with a plurality of second accounts.

Example 7 provides the method of example 1, in which the first account is at the second tier and the second account is at the first tier.

Example 8 provides non-transitory computer-readable tangible media that includes instructions for execution, which when executed by a processor of a computing device, is operable to perform operations including: generating, at a first account, a snapshot of a marketing campaign in a tiered software framework, in which: the tiered software framework comprises a plurality of tiers separated by data access policies such that data at a first tier is accessible at a second tier and data at the second tier is not accessible at the first tier, and the snapshot is generated at the second tier for a marketing campaign to be executed at the first tier; storing an asset in the snapshot at a location identified by a signed uniform resource locator (URL), in which: the signed URL is associated with an asset identifier, and the location refers to a folder in a bucket of a content delivery network (CDN); replacing the asset with the asset identifier in the snapshot; encoding the snapshot as a link; and sharing the link with a second account.

Example 9 provides the non-transitory computer-readable tangible media of example 8, in which the operations further comprise: sending a request for the signed URL to a digital rights management (DRM) service; receiving the signed URL from the DRM service in response to the request; responsive to receiving the signed URL from the DRM service, uploading the asset to the signed URL; subsequent to uploading the asset, sending a status update to the DRM service; and receiving the asset identifier from the DRM service in response to the status update.

Example 10 provides the non-transitory computer-readable tangible media of example 9, in which: the status update includes information on playback and access rights associated with the asset, the information is stored against the signed URL in an asset collection, and the asset identifier encodes the information through the association with the signed URL.

Example 11 provides the non-transitory computer-readable tangible media of example 8, in which the operations further comprise: identifying a conflict for the asset in the second account, wherein the conflict is identified based on an origin identifier of the asset in the second account; displaying a selection to retain or replace the asset in the second account; and skipping the asset, or replacing the asset according to the selection when pushing the snapshot from the first account to the second account.

Example 12 provides the non-transitory computer-readable tangible media of example 8, in which the first account and the second account are at the second tier.

Example 13 provides the non-transitory computer-readable tangible media of example 8, in which the operations further comprise sharing the link simultaneously with a plurality of second accounts.

Example 14 provides the non-transitory computer-readable tangible media of example 8, in which the first account is at the second tier and the second account is at the first tier.

Example 15 provides an apparatus including: a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: generating, at a first account, a snapshot of a marketing campaign in a tiered software framework, in which: the tiered software framework comprises a plurality of tiers separated by data access policies such that data at a first tier is accessible at a second tier and data at the second tier is not accessible at the first tier, and the snapshot is generated at the second tier for a marketing campaign to be executed at the first tier; storing an asset in the snapshot at a location identified by a signed uniform resource locator (URL), in which: the signed URL is associated with an asset identifier, and the location refers to a folder in a bucket of a content delivery network (CDN); replacing the asset with the asset identifier in the snapshot; encoding the snapshot as a link; and sharing the link with a second account.

Example 16 provides the apparatus of example 15, in which the apparatus is further configured for: sending a request for the signed URL to a digital rights management (DRM) service; receiving the signed URL from the DRM service in response to the request; responsive to receiving the signed URL from the DRM service, uploading the asset to the signed URL; subsequent to uploading the asset, sending a status update to the DRM service; and receiving the asset identifier from the DRM service in response to the status update.

Example 17 provides the apparatus of example 16, in which: the status update includes information on playback and access rights associated with the asset, the information is stored against the signed URL in an asset collection, and the asset identifier encodes the information through the association with the signed URL.

Example 18 provides the apparatus of example 15, further configured for: identifying a conflict for the asset in the second account, wherein the conflict is identified based on an origin identifier of the asset in the second account; displaying a selection to retain or replace the asset in the second account; and skipping the asset, or replacing the asset according to the selection when pushing the snapshot from the first account to the second account.

Example 19 provides the apparatus of example 15, in which the first account and the second account are at the second tier.

Example 20 provides the apparatus of example 15, in which the apparatus is further configured for sharing the link simultaneously with a plurality of second accounts.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method for replicating marketing campaigns in a tiered software framework, the method comprising:

generating, at a first account, a snapshot of a marketing campaign in a tiered software framework, wherein:

the tiered software framework comprises a plurality of tiers separated by data access policies such that data at a first tier is accessible at a second tier and data at the second tier is not accessible at the first tier, and the snapshot is generated at the second tier for a marketing campaign to be executed at the first tier;

sending a request from an asset service to a digital rights management (DRM) service for an asset;

responsive to the request, reserving, by the DRM service, a memory space in a content delivery network (CDN) accessible through a uniform resource locator (URL) that points to the memory space and adding the URL to an asset collection comprising a data structure associating an asset identifier of the asset with the URL;

signing the URL, by the DRM service, and returning the signed URL to the asset service;

adding the asset identifier to the snapshot, wherein:

the asset has a first size in memory, the asset identifier has a second size in memory, and the first size is larger than the second size;

responsive to receiving instructions to share the first snapshot to a second account, generating a clone of the snapshot, the clone comprising, in addition to the asset identifier, an alphanumeric string identifying an originating source of the asset in the tiered software framework and metadata relevant to the second account;

encoding the clone as a link, wherein the link has a smaller size in memory than the clone; and sharing the link with the second account.

2. The method of claim 1, further comprising:

responsive to receiving the signed URL from the DRM service, uploading the asset to the signed URL;

subsequent to uploading the asset, sending a status update to the DRM service; and receiving the asset identifier from the DRM service in response to the status update.

3. The method of claim 2, wherein:

the status update includes information on playback and access rights associated with the asset, the information is stored against the signed URL in the asset collection, and the asset identifier encodes the information through the association with the signed URL.

4. The method of claim 1, further comprising:

identifying a conflict for the asset in the second account, wherein the conflict is identified based on the alphanumeric string in the second account;

displaying a selection to retain or replace the asset in the second account; and skipping the asset, or replacing the asset according to the selection when pushing the snapshot from the first account to the second account.

5. The method of claim 1, wherein the first account and the second account are at the second tier.

6. The method of claim 1, further comprising sharing the link simultaneously with a plurality of second accounts.

7. The method of claim 1, wherein the first account is at the second tier and the second account is at the first tier.

8. Non-transitory computer-readable tangible media that includes instructions for execution, which when executed by a processor of a computing device, is operable to perform operations comprising:

generating, at a first account, a snapshot of a marketing campaign in a tiered software framework, wherein:

the tiered software framework comprises a plurality of tiers separated by data access policies such that data at a first tier is accessible at a second tier and data at the second tier is not accessible at the first tier, and the snapshot is generated at the second tier for a marketing campaign to be executed at the first tier;

sending a request from an asset service to a digital rights management (DRM) service for an asset;

responsive to the request, reserving, by the DRM service, a memory space in a content delivery network (CDN) accessible through a uniform resource locator (URL) that points to the memory space and adding the URL to an asset collection comprising a data structure associating an asset identifier of the asset with the URL;

signing the URL, by the DRM service, and returning the signed URL to the asset service;

adding the asset identifier to the snapshot, wherein:

the asset has a first size in memory, the asset identifier has a second size in memory, and the first size is larger than the second size;

responsive to receiving instructions to share the first snapshot to a second account, generating a clone of the snapshot, the clone comprising, in addition to the asset identifier, an alphanumeric string identifying an originating source of the asset in the tiered software framework and metadata relevant to the second account;

encoding the clone as a link, wherein the link has a smaller size in memory than the clone; and sharing the link with the second account.

9. The non-transitory computer-readable tangible media of claim 8, wherein the operations further comprise:

responsive to receiving the signed URL from the DRM service, uploading the asset to the signed URL;

subsequent to uploading the asset, sending a status update to the DRM service; and receiving the asset identifier from the DRM service in response to the status update.

10. The non-transitory computer-readable tangible media of claim 9, wherein:

the status update includes information on playback and access rights associated with the asset, the information is stored against the signed URL in the asset collection, and the asset identifier encodes the information through the association with the signed URL.

11. The non-transitory computer-readable tangible media of claim 8, wherein the operations further comprise:

identifying a conflict for the asset in the second account, wherein the conflict is identified based on the alphanumeric string in the second account;

displaying a selection to retain or replace the asset in the second account; and skipping the asset, or replacing the asset according to the selection when pushing the snapshot from the first account to the second account.

12. The non-transitory computer-readable tangible media of claim 8, wherein the first account and the second account are at the second tier.

13. The non-transitory computer-readable tangible media of claim 8, wherein the operations further comprise sharing the link simultaneously with a plurality of second accounts.

14. The non-transitory computer-readable tangible media of claim 8, wherein the first account is at the second tier and the second account is at the first tier.

15. An apparatus comprising:

a processing circuitry;

a memory storing data; and a communication circuitry, wherein the processing circuitry executes instructions associated with the data, the processing circuitry is coupled to the communication circuitry and the memory, and the processing circuitry and the memory cooperate, such that the apparatus is configured for:

generating, at a first account, a snapshot of a marketing campaign in a tiered software framework, wherein:

the tiered software framework comprises a plurality of tiers separated by data access policies such that data at a first tier is accessible at a second tier and data at the second tier is not accessible at the first tier, and the snapshot is generated at the second tier for a marketing campaign to be executed at the first tier;

sending a request from an asset service to a digital rights management (DRM) service for an asset;

responsive to the request, reserving, by the DRM service, a memory space in a content delivery network (CDN) accessible through a uniform resource locator (URL) that points to the memory space and adding the URL to an asset collection comprising a data structure associating an asset identifier of the asset with the URL;

signing the URL, by the DRM service, and returning the signed URL to the asset service;

adding the asset identifier to the snapshot, wherein:

the asset has a first size in memory, the asset identifier has a second size in memory, and the first size is larger than the second size;

responsive to receiving instructions to share the first snapshot to a second account, generating a clone of the snapshot, the clone comprising, in addition to the asset identifier, an alphanumeric string identifying an originating source of the asset in the tiered software framework and metadata relevant to the second account;

encoding the clone as a link, wherein the link has a smaller size in memory than the clone; and sharing the link with the second account.

16. The apparatus of claim 15, wherein the apparatus is further configured for:

responsive to receiving the signed URL from the DRM service, uploading the asset to the signed URL;

subsequent to uploading the asset, sending a status update to the DRM service; and receiving the asset identifier from the DRM service in response to the status update.

17. The apparatus of claim 16, wherein:

the status update includes information on playback and access rights associated with the asset, the information is stored against the signed URL in the asset collection, and the asset identifier encodes the information through the association with the signed URL.

18. The apparatus of claim 15, further configured for:

identifying a conflict for the asset in the second account, wherein the conflict is identified based on the alphanumeric string in the second account;

displaying a selection to retain or replace the asset in the second account; and skipping the asset, or replacing the asset according to the selection when pushing the snapshot from the first account to the second account.

19. The apparatus of claim 15, wherein the first account and the second account are at the second tier.

20. The apparatus of claim 15, wherein the apparatus is further configured for sharing the link simultaneously with a plurality of second accounts.

* * * * *